(12) United States Patent
Elmieh et al.

(10) Patent No.: US 8,587,593 B2
(45) Date of Patent: Nov. 19, 2013

(54) PERFORMANCE ANALYSIS DURING VISUAL CREATION OF GRAPHICS IMAGES

(75) Inventors: Baback Elmieh, Encinitas, CA (US);
James P. Ritts, San Diego, CA (US);
Angus Dorbie, San Diego, CA (US);
Thomas Fortier, Montreal (CA)

(73) Assignee: QUALCOMM Incorporated, San Diego, CA (US)

( * ) Notice: Subject to any disclaimer, the term of this patent is extended or adjusted under 35 U.S.C. 154(b) by 866 days.

(21) Appl. No.: 12/507,732

(22) Filed: Jul. 22, 2009

(65) Prior Publication Data
US 2010/0020087 A1   Jan. 28, 2010

Related U.S. Application Data

(60) Provisional application No. 61/083,656, filed on Jul. 25, 2008.

(51) Int. Cl.
*G06F 15/16* (2006.01)
*G06F 15/80* (2006.01)
*G06F 13/14* (2006.01)

(52) U.S. Cl.
USPC ........... 345/502; 345/503; 345/504; 345/505; 345/520

(58) Field of Classification Search
USPC .................................. 345/502–505, 520, 522
See application file for complete search history.

(56) References Cited

U.S. PATENT DOCUMENTS

| 5,701,405 A | 12/1997 | Kelley et al. |
| 5,706,479 A | 1/1998 | Winner et al. |
| 5,760,778 A | 6/1998 | Friedman |

(Continued)

FOREIGN PATENT DOCUMENTS

| CN | 1270366 A | 10/2000 |
| CN | 1957377 A | 5/2007 |

(Continued)

OTHER PUBLICATIONS

Asai, E. et. al.: "Web/DVD-Based Multimedia Architecture Simulator," 31st Annual Frontiers in Education Conference. Impact on Engineering and Science Education. Conference Proceedings (CAT. No. 01CH37193), vol. 1, Oct. 10, 2001, pp. T3F-14 to T3F-19, XP002567391 ISBN: 0-7803-6669-7, Abstract; section III. Simulators; Figures 1-6 on pp. T3F-16 to T3F-1; section IV Conclusions.

(Continued)

*Primary Examiner* — Hau Nguyen
(74) *Attorney, Agent, or Firm* — James R. Gambale, Jr.

(57) ABSTRACT

In general, this disclosure relates to techniques for using graphics instructions and state information received from a graphics device to visually create a graphics image. Performance analysis may also be conducted to identify potential bottlenecks during instruction execution on the graphics device. One example device includes a display device and one or more processors. The one or more processors are configured to receive a plurality of graphics instructions from an external graphics device, wherein the graphics instructions are executed by the external graphics device to display a graphics image, and to receive state information from the external graphics device, wherein the state information is associated with execution of the graphics instructions on the external graphics device. The one or more processors are further configured to display, on the display device, a representation of the graphics image according to the graphics instructions and the state information.

52 Claims, 15 Drawing Sheets

(56) References Cited

U.S. PATENT DOCUMENTS

| | | | |
|---|---|---|---|
| 5,889,994 A | 3/1999 | Brown et al. | |
| H1812 H | 11/1999 | Arcuri | |
| 6,091,422 A | 7/2000 | Ouaknine et al. | |
| 6,145,099 A | 11/2000 | Shindou | |
| 7,095,146 B2 | 8/2006 | Fukazawa et al. | |
| 7,095,416 B1 | 8/2006 | Johns et al. | |
| 7,167,171 B2 | 1/2007 | Heim et al. | |
| 7,478,187 B2* | 1/2009 | Knepper et al. | 710/300 |
| 7,623,892 B2* | 11/2009 | Hawkins | 455/556.1 |
| 8,296,738 B1 | 10/2012 | Kiel et al. | |
| 2002/0093520 A1 | 7/2002 | Larson | |
| 2003/0198377 A1 | 10/2003 | Ng | |
| 2005/0018901 A1 | 1/2005 | Kaufmann et al. | |
| 2005/0244040 A1 | 11/2005 | Li et al. | |
| 2006/0109240 A1* | 5/2006 | Fu et al. | 345/156 |
| 2008/0007563 A1 | 1/2008 | Aronson et al. | |
| 2009/0089714 A1 | 4/2009 | Blake et al. | |
| 2009/0097757 A1 | 4/2009 | Wimsatt | |
| 2010/0020069 A1 | 1/2010 | Elmieh et al. | |
| 2010/0020098 A1 | 1/2010 | Elmieh et al. | |

FOREIGN PATENT DOCUMENTS

| | | |
|---|---|---|
| CN | 101046890 A | 10/2007 |
| JP | 10111815 A | 4/1998 |
| JP | 10275248 A | 10/1998 |
| JP | 2000020354 A | 1/2000 |
| JP | 2001191274 A | 7/2001 |
| JP | 2008500625 A | 1/2008 |
| WO | WO2005031640 | 4/2005 |
| WO | WO2005116930 | 12/2005 |
| WO | WO2007002952 | 1/2007 |
| WO | WO2008024940 | 2/2008 |

OTHER PUBLICATIONS

Bender, K. et. al.: "Introduction to the Performance Analyzer for PlayStation 2" Game Developers Conference 2003, Mar. 18, 2003, pp. 1-57, XP002567390, pp. 3-6 and pp. 10-11.

International Search Report & Written Report—PCT/US09/051771, International Search Authority—European Patent Office—Feb. 23, 2010.

Lukashev, D. et. al.: "3D Applications for 3G Mobile Phones: Design, Development, Resource Utilization," Consumer Electronics, 2006. ISCE '06. 2006 IEEE Tenth International Symposium on St. Petersburg, Russia 28-01 June 2006, Piscataway, NJ, USA, IEEE, Jun. 28, 2006, pp. 159-162, XP002465725, ISBN: 978-1-4244-0216-8.

Paul, B. "TR—OpenGL Tile Rendering Library," Aug. 25, 2005, Version 1.3, pp. 1-9.

Sony Ericsson, "Mobile 3D Graphics and Java Applications Development for Sony Ericsson Phones," Nov. 30, 2004, pp. 1-32, XP002567374, Paragraph 3.4 on p. 10; Figures 1,3,4,5 on pp. 19-25.

\* cited by examiner

STATISTICAL/TEXTURE INFORMATION
250

NUMBER OF RENDER CALLS = {VALUE}

AVERAGE TEXTURE CHANGES PER RENDER CALL = {VALUE}
AVERAGE STATE CHANGES PER RENDER CALL = {VALUE}

TRIANGLES THIS FRAME = {VALUE}
VERTICES THIS FRAME = {VALUE}

AVERAGE TRIANGLES PER RENDER CALL = {VALUE}
AVERAGE VERTICES PER RENDER CALL = {VALUE}

PERCENT OF OPTIMIZED TEXTURES (%) = {VALUE}
PERCENT OF INDEXED VERTICES (%) = {VALUE}
PERCENT OF STRIPPED VERTICES (%) = {VALUE}

TEXTURE SIZES:
{TEXTURE SIZE 1} = {VALUE}
{TEXTURE SIZE 2} = {VALUE}
. . .
{TEXTURE SIZE N} = {VALUE}

FIG. 11

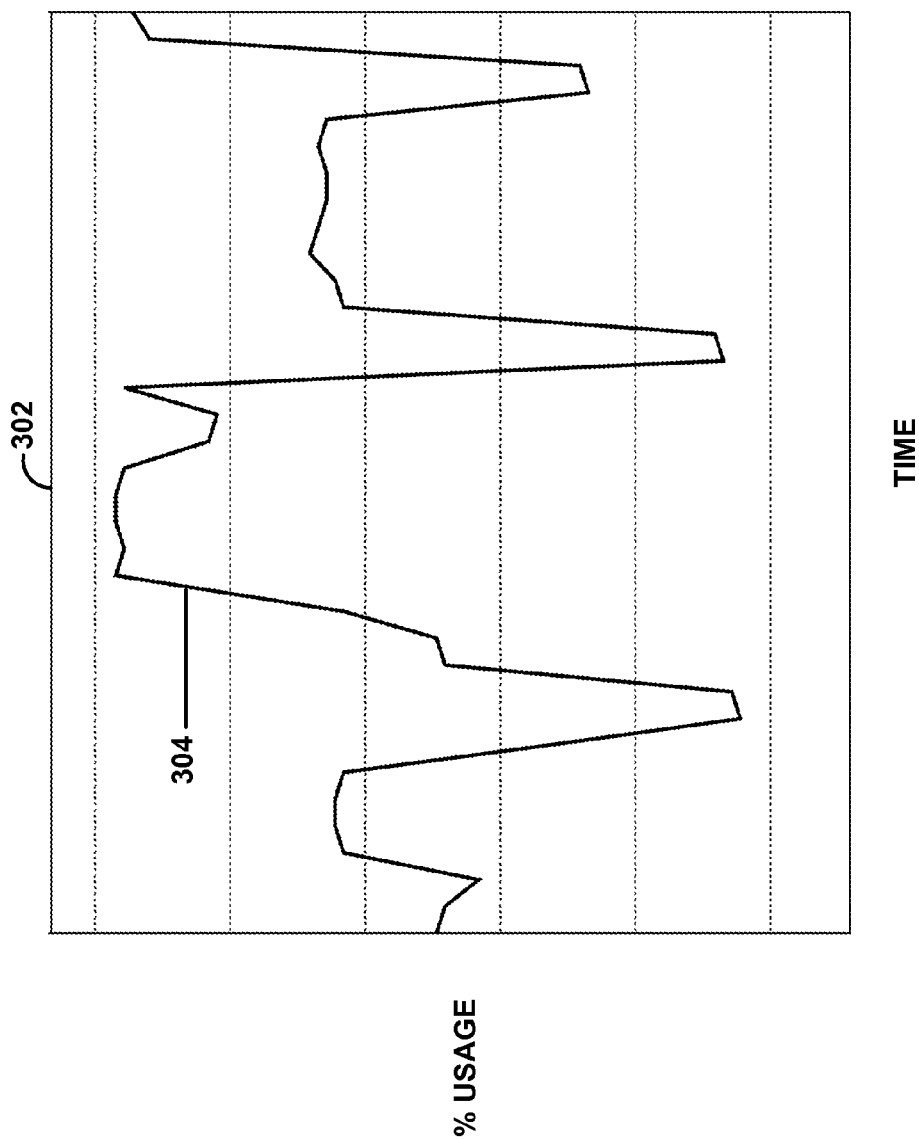

PERFORMANCE ANALYSIS DURING VISUAL CREATION OF GRAPHICS IMAGES

CLAIM OF PRIORITY UNDER 35 U.S.C. §119

The present Application for Patent claims priority to Provisional Application No. 61/083,656 entitled PERFORMANCE ANALYSIS DURING VISUAL CREATION OF GRAPHICS IMAGES filed Jul. 25, 2008, and assigned to the assignee hereof and hereby expressly incorporated by reference herein.

REFERENCE TO CO-PENDING APPLICATIONS FOR PATENT

The present Application for Patent is related to the following co-pending U.S. Patent Applications:
  61/083,659 filed Jul. 25, 2008, filed concurrently herewith, assigned to the assignee hereof, and expressly incorporated by reference herein; and
  61/083,665 filed Jul. 25, 2008, filed concurrently herewith, assigned to the assignee hereof, and expressly incorporated by reference herein.

TECHNICAL FIELD

This disclosure relates to display of graphics images.

BACKGROUND

Graphics processors are widely used to render two-dimensional (2D) and three-dimensional (3D) images for various applications, such as video games, graphics programs, computer-aided design (CAD) applications, simulation and visualization tools, and imaging. Display processors may be used to display the rendered output of the graphics processor for presentation to a user via a display device.

OpenGL® (Open Graphics Library) is a standard specification that defines an API (Application Programming Interface) that may be used when writing applications that produce 2D and 3D graphics. Other languages, such as Java, may define bindings to the OpenGL API's through their own standard processes. The interface includes multiple function calls, or instructions, that can be used to draw scenes from simple primitives. Graphics processors, multi-media processors, and even general purpose CPU's can then execute applications that are written using OpenGL function calls. OpenGL ES (embedded systems) is a variant of OpenGL that is designed for embedded devices, such as mobile wireless phones, digital multimedia players, personal digital assistants (PDA's), or video game consoles.

Graphics applications, such as 3D graphics applications, may describe or define contents of a scene by invoking API's, or instructions, that in turn use the underlying graphics hardware, such as one or more processors in a graphics device, to generate an image. The graphics hardware may undergo a series of state transitions that are exercised through these API's. A full set of states for each API call, such as a draw call or instruction, may describe the process with which the image is rendered by the hardware.

SUMMARY

In general, this disclosure relates to techniques for capturing and analyzing graphics instructions, or call streams, along with state information that is sent from a graphics device, such as a mobile device. The graphics instructions may be generated or compiled from application programming interface (API) instructions. The graphics instructions and state information may be transmitted across a communication medium to an application computing device, such as a personal computer, and used to display a graphics image (such as a 3D image) within a simulation environment.

The displayed graphics image may be a representation of an image that is displayed on the graphics device. The simulation environment is capable of re-creating the image, or scene (which may comprise a series of images). Because the simulation environment may create a scene as it is presented on the graphics device, application developers can isolate performance issues or bottlenecks in their graphics application and prototype modifications that may improve the overall performance of such applications.

In one aspect, a method comprises receiving a plurality of graphics instructions from an external graphics device, wherein the graphics instructions are executed by the external graphics device to display a graphics image, and receiving state information from the external graphics device, wherein the state information is associated with execution of the graphics instructions on the external graphics device. The method further includes displaying a representation of the graphics image according to the graphics instructions and the state information. In certain cases, the method further includes repeating the receiving of the graphics instructions, receiving of the state information, and displaying the representation of the graphics image for multiple frames of the graphics image. In certain cases, the method further includes receiving performance information from the external graphics device, wherein the performance information is associated with execution of the graphics instructions on the external graphics device, and analyzing the performance information to identify one or more performance issues on the external graphics during its execution of the graphics instructions.

The techniques described in this disclosure may be implemented in hardware, software, firmware, or any combination thereof. If implemented in software, the software may be executed in a processor, which may refer to one or more processors, such as a microprocessor, application specific integrated circuit (ASIC), field programmable gate array (FPGA), or digital signal processor (DSP), or other equivalent integrated or discrete logic circuitry. Software comprising instructions to execute the techniques may be initially stored in a computer-readable medium and loaded and executed by a processor.

Accordingly, this disclosure also contemplates computer-readable media comprising instructions to cause a processor to perform any of a variety of techniques as described in this disclosure. In some cases, the computer-readable medium may form part of a computer program product, which may be sold to manufacturers and/or used in a device. The computer program product may include the computer-readable medium, and in some cases, may also include packaging materials.

The details of one or more aspects are set forth in the accompanying drawings and the description below. Other features, objects, and advantages will be apparent from the description and drawings, and from the claims.

BRIEF DESCRIPTION OF DRAWINGS

FIG. 11 is a diagram illustrating an example of statistical and/or texture information that may be displayed by the display device of FIG. 10, according to one aspect of the disclosure.

FIG. 15 is a screen diagram illustrating an example of performance information that may be displayed on the graphics device shown in FIG. 10, according to one aspect of the disclosure.

DETAILED DESCRIPTION

Figure 1:
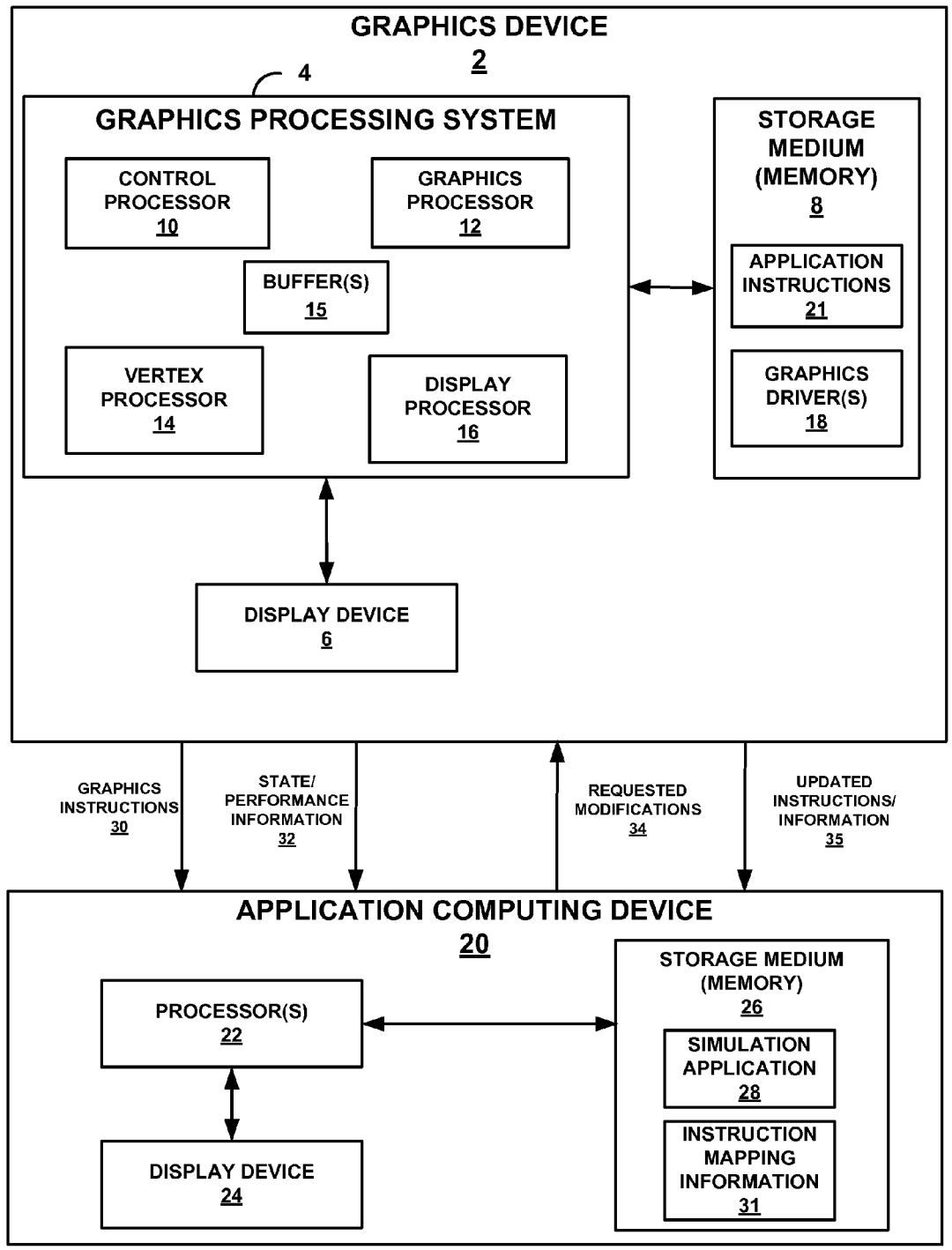
FIG. 1 is a block diagram illustrating a graphics device that may provide graphics instructions, along with state and/or performance information, to an application computing device, according to one aspect of the disclosure.

FIG. 1 is a block diagram illustrating a graphics device 2 that may provide graphics instructions 30, along with state and/or performance information 32, to an application computing device 20, according to one aspect of the disclosure. Graphics device 2 may be a stand-alone device or may be part of a larger system. For example, graphics device 2 may comprise a wireless communication device (such as a wireless mobile handset), or may be part of a digital camera, video camera, digital multimedia player, personal digital assistant (PDA), video game console, other video device, or a dedicated viewing station (such as a television). Graphics device 2 may also comprise a personal computer or a laptop device. Graphics device 2 may also be included in one or more integrated circuits, or chips, which may be used in some or all of the devices described above.

In some cases, graphics device 2 may be capable of executing various applications, such as graphics applications, video applications, audio applications, and/or other multi-media applications. For example, graphics device 2 may be used for graphics applications, video game applications, video playback applications, digital camera applications, instant messaging applications, video teleconferencing applications, mobile applications, or video streaming applications.

Graphics device 2 may be capable of processing a variety of different data types and formats. For example, graphics device 2 may process still image data, moving image (video) data, or other multi-media data, as will be described in more detail below. The image data may include computer-generated graphics data. In the example of FIG. 1, graphics device 2 includes a graphics processing system 4, a storage medium 8 (which comprises memory), and a display device 6.

Programmable processors 10, 12, 14, and 16 may be included within graphics processing system 4. Programmable processor 10 is a control, or general-purpose, processor. Programmable processor 12 is a graphics processor, programmable processor 14 is a vertex processor, and programmable processor 16 is a display processor. Control processor 10 may be capable of controlling graphics processor 12, vertex processor 14, and/or display processor 16. In one aspect, graphics processing system 4 may include other forms of multi-media processors.

In graphics device 2, graphics processing system 4 is coupled both to storage medium 8 and to display device 6. Storage medium 8 may include any permanent or volatile memory that is capable of storing instructions and/or data, such as, for example, synchronous dynamic random access memory (SDRAM), read-only memory (ROM), non-volatile random access memory (NVRAM), embedded dynamic random access memory (eDRAM), static random access memory (SRAM), or flash memory. Display device 6 may be any device capable of displaying image data for display purposes, such as an LCD (liquid crystal display), plasma display device, or other television (TV) display device.

Vertex processor 14 is capable of managing vertex information and processing vertex transformations. In one aspect, vertex processor 14 may comprise a digital signal processor (DSP). Graphics processor 12 may be a dedicated graphics rendering device utilized to render, manipulate, and display computerized graphics. Graphics processor 12 may implement various complex graphics-related algorithms. For example, the complex algorithms may correspond to representations of two-dimensional or three-dimensional computerized graphics. Graphics processor 12 may implement a number of so-called "primitive" graphics operations, such as forming points, lines, and triangles or other polygon surfaces, to create complex, three-dimensional images on a display, such as display device 6.

Graphics processor 12 may carry out instructions that are stored in storage medium 8. Storage medium 8 is capable of storing application instructions 21 for an application (such as a graphics or video application), as well as one or more graphics drivers 18. Application instructions 21 may be loaded from storage medium 8 into graphics processing system 4 for execution. For example, one or more of control processor 10, graphics processor 12, and display processor 16 may execute instructions 21. In one aspect, application instructions 21 may comprise one or more downloadable modules that are downloaded dynamically, over the air, into storage medium 8. In one aspect, application instructions 21 may comprise a call stream of binary instructions that are generated or compiled from application programming interface (API) instructions created by an application developer.

Graphics drivers 18 may also be loaded from storage medium 8 into graphics processing system 4 for execution. For example, one or more of control processor 10, graphics processor 12, and display processor 16 may execute certain instructions from graphics drivers 18. In one example aspect, graphics drivers 18 are loaded and executed by graphics processor 12. Graphics drivers 18 will be described in further detail below.

As also shown in FIG. 1, graphics processing system 4 includes one or more buffers 15. Control processor 10, graphics processor 12, vertex processor 14, and/or display processor 16 each have access to buffers 15, and may store data in or retrieve data from buffers 15. Buffers 15 may comprise cache memory, and may be capable of storing both data and instructions. For example, buffers 15 may include one or more of application instructions 21 or one or more instructions from graphics drivers 18 that have been loaded into graphics processing system 4 from storage medium 8. Buffers 15 and/or storage medium 8 may also contain graphics data used during instruction execution.

Applications instructions 21 may, in certain cases, include instructions for a graphics application, such as a 3D graphics application. Application instructions 21 may comprise instructions that describe or define contents of a graphics scene that includes one or more graphics images. When application instructions 21 are loaded into and executed by graphics processing system 4, graphics processing system 4 may undergo a series of state transitions. One or more instructions within graphics drivers 18 may also be executed to render or display graphics images on display device 6 during executing of application instructions 21.

A full set of states for instruction, such as a draw call, may describe a process with which an image is rendered by graphics processing system 4. However, an application developer who has written application instructions 21 may often have limited ability to interactively view or modify these states for purposes of debugging or experimenting with alternate methods of describing or rendering images in a defined scene. In addition, different hardware platforms, such as the platform of graphics processing system 17 shown in FIG. 2, may have different hardware designs and implementations of these states and/or state transitions.

Thus, in one aspect, an application developer may use application computing device 20, shown in FIG. 1, to assist in the processing of debugging and experimenting with alternate methods for describing or rendering images in a scene. Application computing device 20 is coupled to graphics device 2. For example, in one aspect, application computing device 20 is coupled to graphics device 2 via a Universal Serial Bus (USB) connection. In other aspects, other types of connections, such as wireless or other forms of wired connections, may be used.

Application computing device 20 includes one or more processors 22, a display device 24, and a storage medium 26. Processors 22 may include one or more of a control processor, a graphics processor, a vertex processor, and a display processor, according to one aspect. Storage medium 26 may include any permanent or volatile memory that is capable of storing instructions and/or data, such as, for example, synchronous dynamic random access memory (SDRAM), read-only memory (ROM), non-volatile random access memory (NVRAM), static random access memory (SRAM), or flash memory. Display device 24 may be any device capable of displaying image data for display purposes, such as an LCD (liquid crystal display), plasma display device, or other television (TV) display device.

Application computing device 20 is capable of capturing and analyzing graphics instructions 30, along with state and/or performance information 32, that is sent from graphics device 2. In one aspect, graphics drivers 18 are configured to send graphics instructions 30 and state/performance information 32 to application computing device 20. Graphics instructions 30 may include one or more of application instructions 21, and state/performance information 32 may be generated or captured during execution of graphics instructions 30 within graphics processing system 4.

State/performance information 32 includes information about the state and performance of graphics processing system 4 during instruction execution, and will be described in more detail below. State/performance information 32 may include graphics data (e.g., primitive and/or rasterized graphics data) that may be used, or is otherwise associated, with graphics instructions 30. Graphics processing system 4 may execute graphics instructions 30 to display an image, or a scene of images, on display device 6. Application computing device 20 is capable of using graphics instructions 30, along with state/performance information 32, to create the graphics image or scene that is also shown on display device 6 of graphics device 2.

Simulation application 28 may be executed by processors 22 of application computing device 20 to create the graphics image or scene upon receipt of graphics instructions 30 and state/performance information 32, and display the image, or scene of images, on display device 24. Simulation application 28 may comprise a software module that contains a number of application instructions. Simulation application 28 is stored in storage medium 26, and may be loaded and executed by processors 22. Simulation application 28 may be pre-loaded into storage medium 26, and may be customized to operate with graphics device 2. In one aspect, simulation application 28 simulates the hardware operation of graphics device 2. Different versions of simulation application 28 may be stored in storage medium 26 and executed by processors 22 for different graphics devices having different hardware designs. In some cases, software libraries may also be stored within storage medium 26, which are used in conjunction with simulation application 28. In one aspect, simulation application 28 may be a generic application, and specific hardware or graphics device simulation functionality may be included within each separate library that may be linked with simulation application 28 during execution.

In one aspect, a visual representation of state/performance information 32 may be displayed to application developers on display device 24. In addition, a visual representation of graphics instructions 30 may also be displayed. Because, in many cases, graphics instructions 30 may comprise binary instructions, application computing device 20 may use instruction mapping information 31 to generate the visual representation of graphics instructions 30 on display device 24. Instruction mapping information 31 is stored within storage medium 26 and may be loaded into processors 22 in order to display a visual representation of graphics instructions 30.

In one aspect, instruction mapping information 31 may include mapping information, such as within a lookup table, to map graphics instructions 30 to corresponding API instructions that may have been previously compiled when generating graphics instructions 30. Application developers may write programs that use API instructions, but these API instructions are typically compiled into binary instructions, such as graphics instructions 30 (which are included within application instructions 21), for execution on graphics device 2. One or more instructions within graphics instructions 30 may be mapped to an individual API instruction. The mapped API instructions may then be displayed to an application developer on display device 24 to provide a visual representation of the graphics instructions 30 that are actually being executed.

In one aspect, a user, such as an application developer, may wish to change one or more of the graphics instructions 30 to determine, for example, the effects of such changes on performance. In this aspect, the user may change the visual representation of graphics instructions 30. Mapping information 31 may then be used to map these changes within the visual representation of graphics instructions 30 to binary instructions that can then be provided back to graphics device 2 within requested modifications 34, as will be described in more detail below.

As described above, the graphics image that is displayed on display device 24 of application computing device 20 may be a representation of an image that is displayed on graphics device 2. Because simulation application 28 may use graphics instructions 30 and state/performance information 32 to create an image or scene exactly as it is presented on graphics device 2, application developers that use application computing device 20 may be able to quickly identify potential performance issues or bottlenecks during execution of graphics applications 30, and even prototype modifications to improve the overall performance of graphics applications 30.

For example, an application developer may choose to make one or more requested modifications 34 to graphics instructions 30 and/or state/performance information 32 during execution of simulation application 28 on application computing device 20 and display of the image on display device 24. Any such requested modifications 34 may be based upon observed performance issues, or bottlenecks, during execution of graphics instructions 30 or analysis of state/performance information 32. These requested modifications 34 may then be sent from application computing device 20 to graphics device 2, where they are processed by graphics processing system 4. In one aspect, one or more of graphics drivers 18 are executed within graphics processing system 4 to process requested modifications 34. Requested modifications 34, in some cases, may include modified instructions. In some cases, requested modifications may include modified state and/or performance information.

Upon processing of requested modifications 34, updated instructions and/or information 35 is sent back to application computing device 20, such as by one or more of graphics drivers 18. Updated instructions/information 35 may include updated graphics instructions for execution based upon requested modifications 34 that were processed by graphics device 2. Updated instructions/information 35 may also include updated state and/or performance information based upon the requested modifications 34 that were processed by graphics device 2.

The updated instructions/information 35 is processed by simulation application 28 to update the display of the image information on display device 24, and also to provide a visual representation of updated instructions/information 35 to the application developer (which may include again using instruction mapping information 31). The application developer may then view the updated image information on display device 24, as well as the visual representation of updated instructions/information 35, to determine if the performance issues have been resolved or mitigated. The application developer may use an iterative process to debug graphics instructions 30 or prototype modifications to improve the overall performance graphics applications 30.

Figure 2:
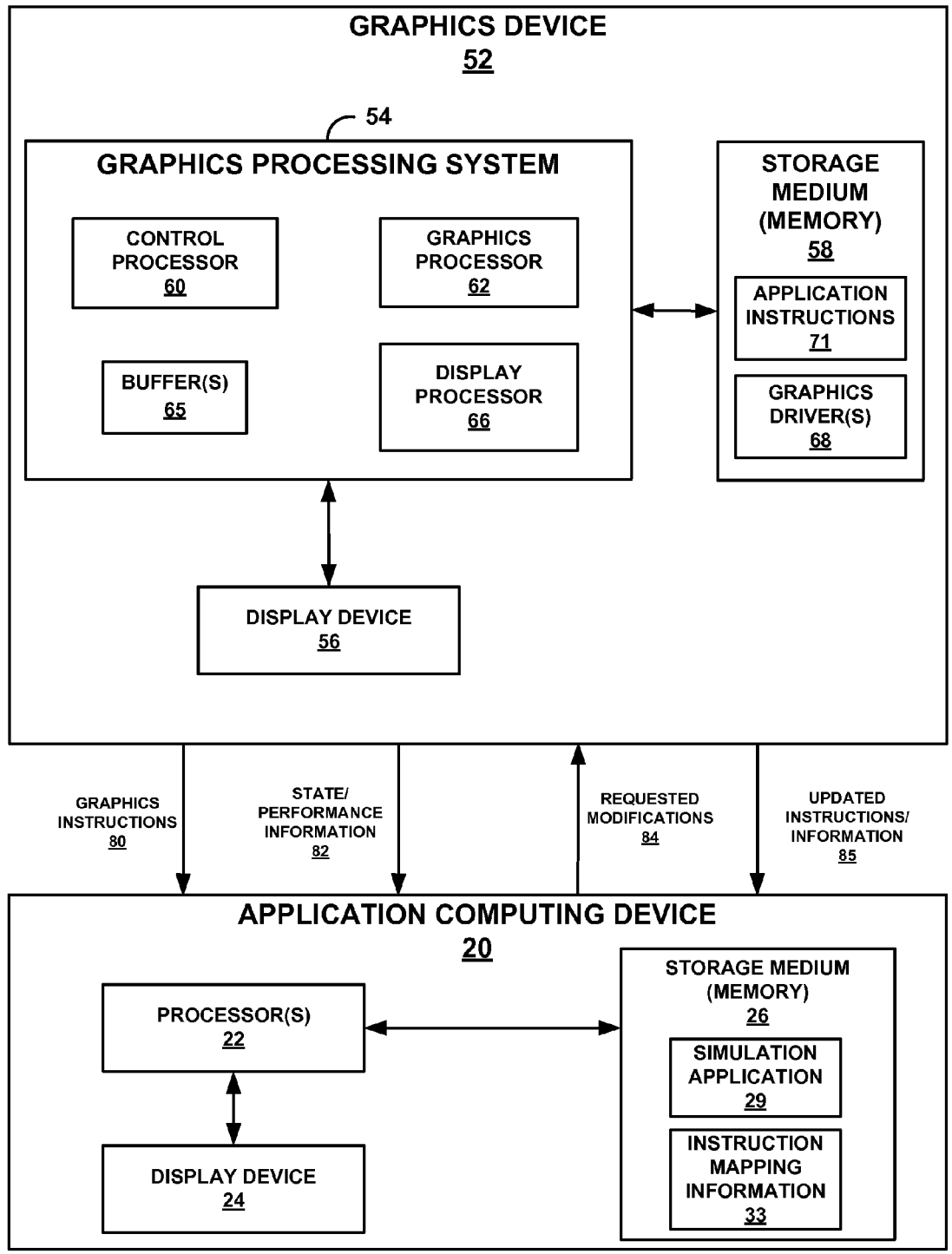
FIG. 2 is a block diagram illustrating a graphics device that may provide graphics instructions, along with state and/or performance information, to an application computing device, according to another aspect of the disclosure.

FIG. 2 is a block diagram illustrating a graphics device 52 that may provide graphics instructions 80, along with state and/or performance information 82, to application computing device 20, according to another aspect of the disclosure. In this aspect, graphics device 52 has a different hardware design and architecture than graphics device 2 shown in FIG. 1. However, application computing device 20 is still capable of interacting with and creating image information and displaying performance information for graphics device 52 by using another simulation application 29. In FIG. 1, simulation program 28 is designed and customized for use with graphics device 2. In FIG. 2, simulation program 29 is designed and customized for use with graphics device 52.

As is shown in FIG. 2, graphics device 52 includes graphics processing system 54, display device 56, and storage medium 58. Unless graphics processing system 4 (FIG. 1), graphics processing system 54 does not include a vertex processor. Graphics processing system 54 includes a control processor 60, a graphics processor 62, a display processor 66, and one or more buffers 65. Control processor 60 may control graphics processor 62 and/or display processor 66. Each of control processor 60, graphics processor 62, and display processor 66 has access to buffers 65, which may contain data or instructions.

Similar to storage medium 8 (FIG. 1), storage medium 58 of graphics device 52 is capable of storing instructions and drivers. As is shown in FIG. 2, storage medium (comprising memory) includes application instructions 71 and one or more graphics drivers 68. Application instructions 71 may comprise instructions for a graphics application, and graphics drivers 68 may comprise instructions for display of image data on display device 56 and instructions for communicating with application computing device 20. Application instructions 71 and graphics drivers 68 may be loaded into and executed by control processor 60, graphics processor 62, and/or display processor 66 in graphics processing system 54. In some cases, one or more of application instructions 71 and one or more instructions from graphics drivers 68 may be loaded into buffers 65 for execution within graphics processing system 54.

During execution of application instructions 71 within graphics processing system 54, one or more of graphics drivers 68 may also, during execution, send graphics instructions 80 and state and/or performance information 82 to application computing device 20. Graphics instructions 80 may comprise a portion or subset of application instructions 71. State/performance information 82 may be based upon execution of graphics instructions 80 within one or more of control processor 60, graphics processor 62, and display processor 66.

Simulation application 29 may be loaded into and executed by one or more of processors 22 to process graphics instructions 80 and state/performance information 82. As noted above, simulation application 29 may be designed specifically to simulate the operation of graphics device 52. Various types of designs of graphics devices may be simulated on application computing device 20 through creation and execution of corresponding simulation applications.

Simulation application 29 may cause processors 22 to display a representation of a graphics image or scene on display device 24 according to the received graphics instructions 80 and state/performance information 82. This image or scene may have originally have been displayed on display device 56 of graphics device 52, but its representation is displayed on display device 24. In addition, simulation application 29 may cause processors 22 to display a visual representation of state/performance information 82 on display device 24. Application computing device 20 may also use instruction mapping information 33 to provide a visual representation of graphics instructions 80 in display device 24.

An application developer may also choose to make one or more requested modifications 84 to graphics instructions 80 and/or state/performance information 82 during execution of simulation application 29. Any such requested modifications 84 may be based upon observed performance issues, or bottlenecks, during execution of graphics instructions 80 or analysis of state/performance information 82. These requested modifications 84 may then be sent from application computing device 20 to graphics device 52, where they may be processed by one or more of graphics drivers 68.

Upon processing of requested modifications 84, updated instructions and/or information 85 is sent back to application computing device 20 by the one or more of graphics drivers 68. Updated instructions/information 85 may include updated graphics instructions, updated state information, and/or updated performance information.

The updated instructions/information 85 is processed by simulation application 29 to update the display of the image information on display device 24, and also to provide a visual representation of updated instructions/information 85 to the application developer. The application developer may view the updated image information on display device 24, as well as the visual representation of updated instructions/information 85, to determine if the performance issues have been resolved or mitigated. The application developer may use an iterative process to debug graphics instructions 80 or prototype modifications to improve the overall performance graphics applications 80.

Figure 3:
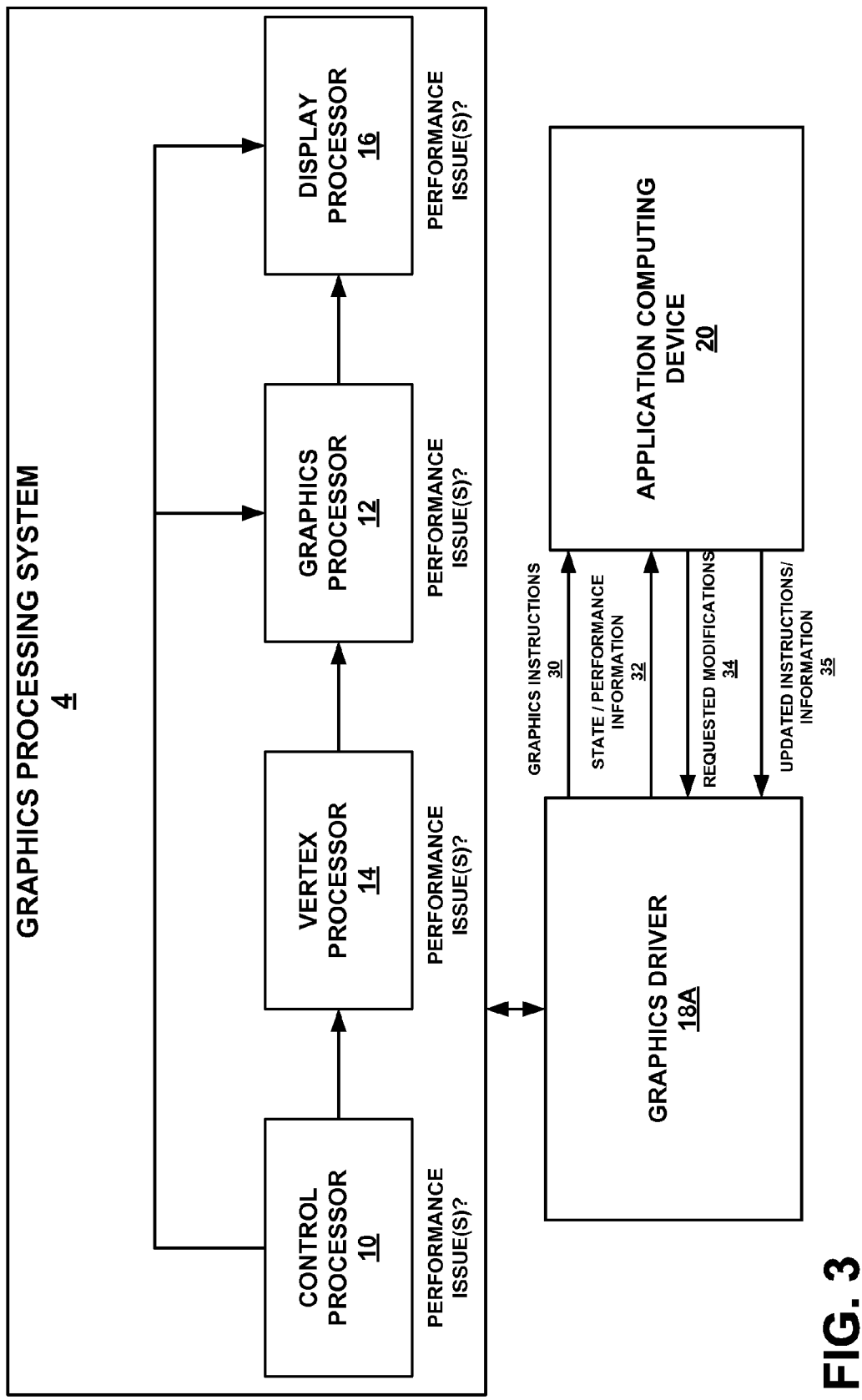
FIG. 3 is a block diagram illustrating certain details of the graphics processing system, graphics driver, and application computing device shown in FIG. 1, according to one aspect of the disclosure.

FIG. 3 is a block diagram illustrating certain details of graphics processing system 4, graphics driver 18, and application computing device 20 shown in FIG. 1, according to one aspect. In FIG. 3, it is assumed that application computing device 20 is coupled to graphics processing system 4 of device 2. However, this is shown for illustration purposes only. In other scenarios, application computing device 20 may be coupled to many other forms of graphics processing systems and devices, such as graphics processing system 54 of device 52 (FIG. 2).

As shown in FIG. 3, graphics processing system 4 includes four programmable processors: control processor 10, vertex processor 14, graphics processor 12, and display processor 16, which are also shown in FIG. 1. Control processor 10 may control any of vertex processor 14, graphics processor 12, or display processor 16. In many cases, these processors 10, 12, 14, and 16 may be part of a graphics processing pipeline within system 4.

Control processor 10 may control one or more aspects of the flow of data or instruction execution through the pipeline, and may also provide geometry information for a graphics image to vertex processor 14. Vertex processor 14 may manage vertex transformation or geometry processing of the graphics image, which may be described or defined according to multiple vertices in primitive geometry form. Vertex processor 14 may provide its output to graphics processor 12, which may perform rendering or rasterization operations on the graphics image. Graphics processor 12 may provide its output to display processor 16, which prepares the graphics image, in pixel form, for display. Graphics processor 12 may also perform various operations on the pixel data, such as shading or scaling.

Often, graphics image data may be processed in this processing pipeline during execution of graphics instructions 30, which may be part of application instructions 21 (FIG. 1). As a result, graphics instructions 30 may be executed by one or more of control processor 10, vertex processor 14, graphics processor 12, and display processor 16. Application developers may typically not have much knowledge or control of which particular processors within graphics processing system 4 execute which ones of graphics instructions 30. In some cases, one or more of control processor 10, vertex processor 14, graphics processor 12, and display processor 16 may have performance issues, or serve as potential bottlenecks within the processing pipeline, during the execution of graphics instructions 30. In these cases, overall performance within graphics processing system 4 may be deteriorated, and the application developer may wish to make changes the graphics instructions 30 to improve performance. However, the developer may not necessarily know which ones of processors 10, 12, 14, or 16 may be the ones that have performance issues.

To assist with the problem of identifying performance bottlenecks and potential solutions, the graphics driver 18A of graphics device 2 may capture, or collect, graphics instructions 30 from graphics processing system 4 and route them to application computing device 20, as shown in FIG. 3. Graphics driver 18A is part of graphics drivers 18 shown in FIG. 1. Graphics driver 18A may be loaded and executed by one or more of control processor 10, vertex processor 14, graphics processor 12, and display processor 16. In addition, graphics driver 18A may also collect state and/or performance information 32 from one or more of control processor 10, vector processor 14, graphics processor 12, and display processor 16 and route this information 32 to application computing device 20, as well. In one aspect, graphics driver 18A may comprise an OpenGL ES driver when graphics instructions 30 include binary instructions that may have been generated or compiled from OpenGL ES API instructions.

Various forms of state data may be included within state/performance information 32. For example, the state data may include graphics data used during execution of, or otherwise associated with, graphics instructions 30. The state data may be related to a vertex array, such as position, color, coordinates, size, or weight data. State data may further include texture state data, point state data, line state data, polygon state data, culling state data, alpha test state data, blending state data, depth state data, stencil state data, or color state data. As described previously, state data may include both state information and actual data. In some cases, the state data may comprise data associated with one or more OpenGL tokens.

Various forms of performance data may also be included within state/performance information 32. In general, this performance data may include metrics or hardware counter data from one or more of control processor 10, vertex processor 14, graphics processor 12, and display processor 16. The performance data may include frame rate or cycle data. The cycle data may include data for cycles used for profiling, command arrays, vertex and index data, or other operations. In various aspects, various forms of state and performance data may be included within state/performance information 32 that is collected from graphics processing system 4 by graphics driver 18A.

As described previously, application computing device 20 may display a representation of a graphics image according to received graphics instructions 30 and state/performance information 32. Application computing device 20 may also display a visual representation of state/performance information 32. By viewing and interacting with the re-created graphics image and/or the visual representation of the state/performance information 32, an application developer may be able to quickly identify and resolve performance issues within graphics processing system 4 of graphics device 2 during execution of graphics instructions 30. For example, the application developer may be able to identify which specific ones of processors 10, 12, 14, and/or 16 may have performance issues.

In an attempt to identify a workaround or resolution to any identified performance issues, the developer may initiate one or more requested modifications 34 on application computing device 20. For example, the developer may interact with the re-created image or the representation of state/performance information 32 to create the requested modifications 34. In some cases, the developer may even directly change the state/performance information 32, as described in more detail below, to generate the requested modifications 34. In certain cases, requested modifications 34 may include one or more requests to disable execution of one or more of graphics instructions 30 in graphics processing system 4 of graphics device 2, or requests to modify one or more of graphics instructions 30.

Requested modifications 34 are sent from application computing device 20 to graphics driver 18A, which handles the requests for graphics device 2 during operation. In many cases, the requested modifications 34 may include requests to modify state information, which may include data, within one or more of processors 10, 12, 14, or 16 within graphics processing system 4 during execution of graphics instructions 30. Graphics driver 18A may then implement the changes within graphics processing system 4 that are included within requested modifications 34. These changes may alter the flow of execution amongst processors 10, 12, 14, and/or 16 for execution of graphics instructions 30. In certain cases, one or more of graphics instructions 30 may be disabled during execution in graphics processing system 4 according to requested modifications 34.

Graphics driver 18A is capable of sending updated instructions and/or information 35 to application computing device 20 in response to the processing of requested modifications 34. Updated instructions/information 35 may include updated state information collected from graphics processing system 4 by graphics driver 18A, including performance information. Updated instructions/information 35 may also include updated graphics instructions.

Application computing device 20 may use updated instructions/information 35 to display an updated representation of the graphics image, as well as a visual representation of updated instructions/information 35. The application developer may then be capable of assessing whether the previously identified performance issues have been resolved or otherwise addressed. For example, the application developer may be able to analyze the updated image, as well as the visual representation of updated instructions/information 35 to determine if certain textures, polygons, or other features have been optimized, or if other performance parameters have been improved.

In such fashion, the application developer may be able to rapidly and effectively debug or analyze execution of graphics instructions 30 within an environment on application computing device 20 that simulates the operation of graphics processing system 4 on graphics device 2. The developer may iteratively interact with the displayed image and state/performance information on application computing device 20 to analyze multiple graphics images in a scene or multiple image frames to maximize execution performance of graphics instructions 30. Examples of such interaction and displayed information on application computing device 20 will be presented in more detail below.

Figure 4:
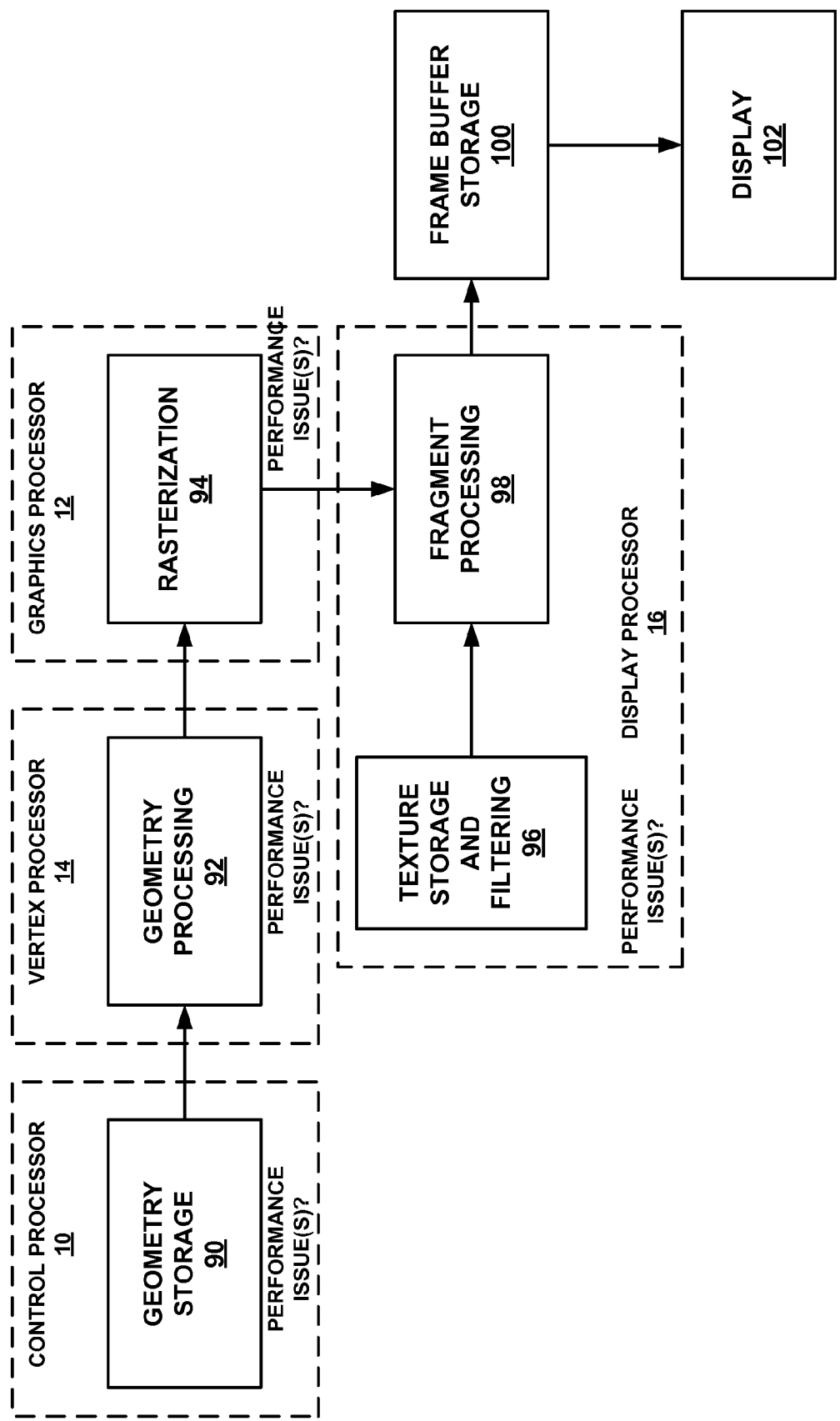
FIG. 4 is a flow diagram illustrating additional details of operations that may be performed by the control processor, graphics processor, vertex processor, and display processor shown in FIG. 1, according to one aspect of the disclosure.

FIG. 4 is a flow diagram illustrating additional details of operations that may be performed by control processor 10, graphics processor 12, vertex processor 14, and display processor 16, according to one aspect. FIG. 4 also shows operations for frame buffer storage 100 and display 102. In one aspect, control processor 10, vertex processor 14, graphics processor 12, and/or display processor 16 perform various operations as a result of execution of one or more of graphics instructions 30.

As described previously, control processor 10 may control one or more aspects of the flow of data or instruction execution through the graphics processing pipeline, and may also provide geometry information to vertex processor 14. As shown in FIG. 4, control processor 10 may perform geometry storage at 90. In some cases, geometry information for one or more primitives may be stored by control processor 10 in buffers 15 (FIG. 1). In some cases, geometry information may be stored in storage medium 8.

Vertex processor 14 may then obtain the geometry information for a given primitive provided by control processor and/or stored in buffers 15 for processing at 92. In certain cases, vertex processor 14 may manage vertex transformation of the geometry information. In certain cases, vertex processor 14 may perform lighting operations on the geometry information.

Vertex processor 14 may provide its output to graphics processor 12, which may perform rendering or rasterization operations on the data at 94. Graphics processor 12 may provide its output to display processor 16, which prepares one or more graphics images, in pixel form, for display. Display processor 16 may perform various operations on the pixel data, including fragment processing to process various fragments of the data, at 98. In certain cases, this may include one or more of depth testing, stencil testing, blending, or texture mapping, as is known in the art. When performing texture mapping, display processor 16 may incorporate texture storage and filtering information at 96. In some cases, graphics processor 16 may perform other operations on the rasterized data, such as shading or scaling operations.

Display processor 16 provides the output pixel information for storage into a frame buffer at 100. In some cases, the frame buffer may be included within buffers 15 (FIG. 1). In other cases, the frame buffer may be included within storage medium 8. The frame buffer stores one or more frames of image data, which can then be displayed at 102, such as on display device 6.

As described previously, graphics instructions 30 may be executed by one or more of control processor 10, vertex processor 14, graphics processor 12, and display processor 16. Application developers may typically not have much knowledge or control of which particular processors within graphics processing system 4 execute which ones of graphics instructions 30. In certain cases, one or more of control processor 10, vertex processor 14, graphics processor 12, and display processor 16 may have performance issues, or serve as potential bottlenecks within the processing pipeline, during the execution of graphics instructions 30. It may often be difficult for an application developer to pinpoint the location of a bottleneck, or how best to resolve or mitigate the effects of such a bottleneck. Thus, in one aspect, graphics instructions 30 and/or state information may be provided from graphics device 2 to an external computing device, such as application computing device 20. The state information may include data from one or more of control processor 10, vertex processor 14, graphics processor 12, and display processor 16 with respect to various operations, such as those shown in FIG. 4, that occur during the execution of graphics instructions 30. Application computing device 20 may create a graphics image that is shown on device 2 in order to help identify and resolve bottlenecks in an efficient and effective manner.

Figure 5:
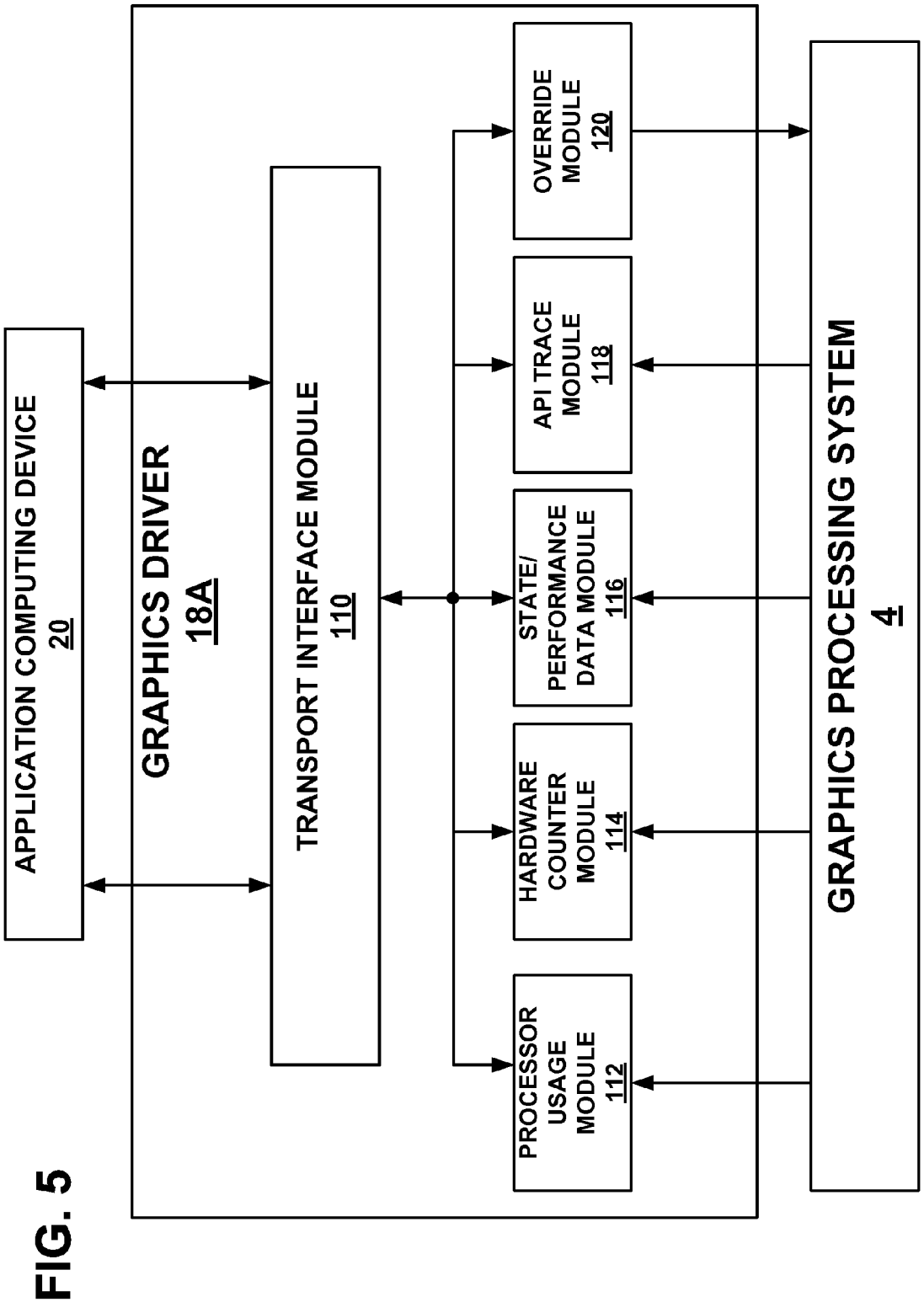
FIG. 5 is a block diagram illustrating additional details of the graphics driver shown in FIG. 3, according to one aspect of the disclosure.

FIG. 5 is a block diagram illustrating additional details of graphics driver 18A shown in FIG. 3, according to one aspect. As described previously, graphics driver 18A may comprise instructions that can be executed within graphics processing system 4 (such as, for example, by one or more of control processor 10, vertex processor 14, graphics processor 12, and display processor 16), and may be part of graphics drivers 18. Execution of graphics driver 18A allows graphics processing system 4 to communicate with application computing device 20. In one aspect, graphics driver 18A may comprise instructions that can be executed within graphics processing system 54, and may be part of graphics drivers 68.

Graphics driver 18A, when executed, includes various functional blocks, which are shown in FIG. 5 as transport interface 110, processor usage module 112, hardware counter module 114, state/performance data module 116 that can manage other state and/or performance data, API trace module 118, and override module 120. Graphics driver 18A uses transport interface module 110 to communicate with application computing device 20.

Processor usage module 112 collects and maintains processor usage information for one or more of control processor 10, vertex processor 14, graphics processor 12, and display processor 16. The processor usage information may include processor cycle and/or performance information. Cycle data may include data for cycles used for profiling, command arrays, vertex and index data, or other operations. Processor usage module 112 may then provide such processor usage information to application computing device 20 via transport interface module 110. In some cases, processor usage module 112 provides this information to device 20 as it receives the information, in an asynchronous fashion. In other cases, processor usage module 112 may provide the information upon receipt of a request from device 20.

Hardware counter module 114 collects and maintains various hardware counters during execution of instructions by one or more of control processor 10, graphics processor 12, vertex processor 14, or display processor 16. The counters may keep track of various state indicators and/or metrics with respect to instruction execution within graphics processing system 4. Hardware counter module 114 may provide information to device 20 asynchronously or upon request.

State/performance data module 116 collects and maintains other state and/or performance data for one or more of control processor 10, graphics processor 12, vertex processor 14, and display processor 16 in graphics processing system 4. For example, the state data may, in some cases, comprise graphics data. The state data may include data related to a vertex array, such as position, color, coordinates, size, or weight data. State data may further include texture state data, point state data, line state data, polygon state data, culling state data, alpha test state data, blending state data, depth state data, stencil state data, or color state data. Performance data may include various other metrics or cycle data. State/performance data module 116 may provide information to device 20 asynchronously or upon request.

API trace module 118 manages a flow and/or trace of graphics instructions that are executed by graphics processing system 4 and transported to application computing device 20 via transport interface module 110. As described previously, graphics device 2 provides a copy of graphics instructions 30, which are executed by graphics processing system 4 in its processing pipeline, to device 20. API trace module 118 manages the capture and transport of these graphics instructions 30. API trace module 118 may also provide certain information used with instruction mapping information 31 (FIG. 1) to map graphics instructions 30 to a visual representation of graphics instructions 30, such as API instructions that may have been used to generate graphics instructions 30.

Override module 120 allows graphics driver 18A to change, or override, the execution of certain instructions within graphics processing system 4. As described previously, application computing device 20 may send one or more requested modifications, such as modifications 34, to graphics device 2. In certain cases, requested modifications 34 may include one or more requests to disable execution of one or more of graphics instructions 30 in graphics processing system 4, or requests to modify one or more of graphics instructions 30. In some cases, requested modifications 34 may include requests to change state/performance information 32.

Override module 120 may accept and process requested modifications 34. For example, override module 120 may receive from device 20 any requests to modify one or more of graphics instructions 30, along with any requests to modify state/performance information 32, and send such requests to graphics processing system 4. One or more of control processor 10, graphics processor 12, vertex processor 14, and display processor 16 may then process these requests and generate updated instructions/information 35. Override module 120 may then send updated instructions/information 35 to application computing device 20 for processing, as described previously.

In such fashion, graphics driver 18A provides an interface between graphics device 2 and application computing device 20. Graphics driver 18A is capable of providing graphics instructions and state/performance information 32 to application computing device 20, and also receiving requested modifications 34 from application computing device 20. After processing such requested modifications 34, graphics driver 18A is subsequently able to provide updated instructions/information 35 back to application computing device 20.

Figure 6:
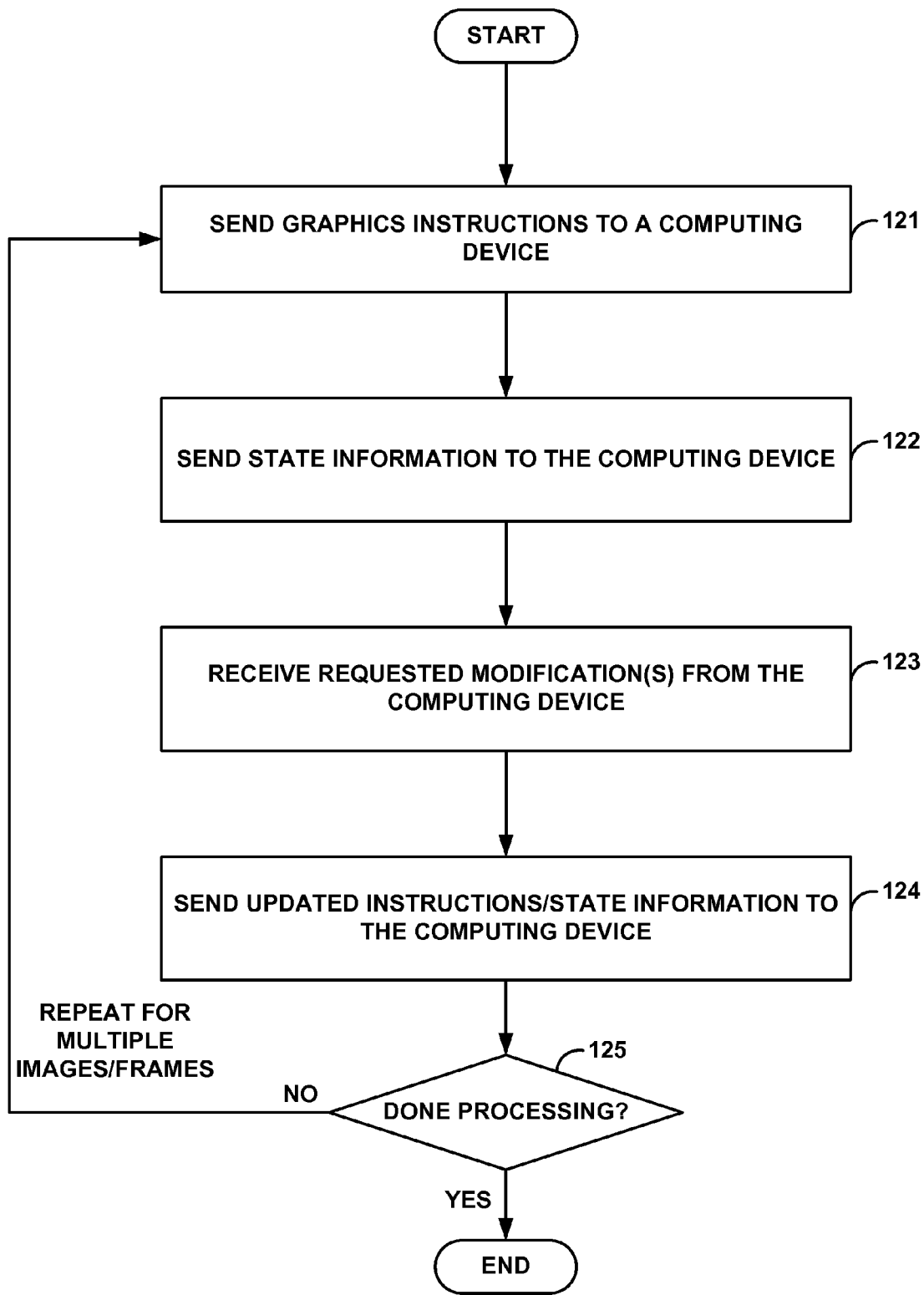
FIG. 6 is a flow diagram of a method that may be performed by the graphics device shown in FIG. 1 or FIG. 2, according to one aspect of the disclosure.

FIG. 6 is a flow diagram of a method that may be performed by graphics device 2 shown in FIG. 1 or graphics device 52 shown FIG. 2, according to one aspect of the disclosure. For purposes of illustration only, it will be assumed in the subsequent description that the method of FIG. 6 is performed by graphics device 2.

Graphics device 2 may send a plurality of graphics instructions to a computing device, such as application computing device 20 (121). The graphics instructions, such as graphics instructions 30, are executed by graphics device 2 to display a graphics image. Graphics instructions 30 may comprise binary instructions that are generated from application programming interface (API) instructions. In one aspect, graphics device 2 may send graphics instructions 30 using API trace module 118 of graphics driver 18A (FIG. 5). Graphics device 2 also sends state/performance information 32 to application computing device 20 (122). State/performance information 32 is associated with execution of graphics instructions 30 by graphics device 2. In one aspect, graphics device 2 may send state/performance information 32 using state/performance data module 116 of graphics driver 18A. State/performance information 32 may comprise state information or data from one or more of processors 10, 12, 14, or 16 of graphics device 2 that executes graphics instructions 30, and may include graphics data. State/performance information 32 may also comprise performance metrics gathered from one or more of these processors 10, 12, 14, or 16. In these cases, graphics device 2 may send state/performance information 32 using processor usage module 112 and/or hardware counter module 114 of graphics driver 18A.

Graphics device 2 is also capable of receiving one or more requested modifications 34 from application computing device 20 (123). These requested modifications 34 may cause graphics device 2 to modify the execution of graphics instructions 30 by graphics device 2. Requested modifications 34 may include one or more of a request to disable execution of one or more of graphics instructions 30 on graphics device 2, a request to modify one or more of graphics instructions 30 on graphics device 2, or a request to modify state information on graphics device 2. In one aspect, graphics device 2 may receive requested modifications 34 using override module 120, API trace module 118, and/or state/performance data module 116 of graphics driver 18A.

Upon processing of requested modifications 34, graphics device 2 may send updated instructions and/or state information 35 to application computing device 20 based upon requested modifications 34 (124). In one aspect, graphics device 2 may send updated instructions/information 35 using API trace module 118 and/or state/performance data module 116 of graphics driver 18A.

If graphics device 2 has not finished processing information for one or more graphics image or image frames (125), graphics device may repeat the sending of graphics instructions 30, sending of state/performance information 32, receiving of requested modifications 34, and sending of updated instructions/information 35 for multiple images or frames of a graphics image. In some cases, graphics device 2 may display one or more graphics images on display device 6 according to graphics instructions 30 and the state/performance information 32.

Figure 7:
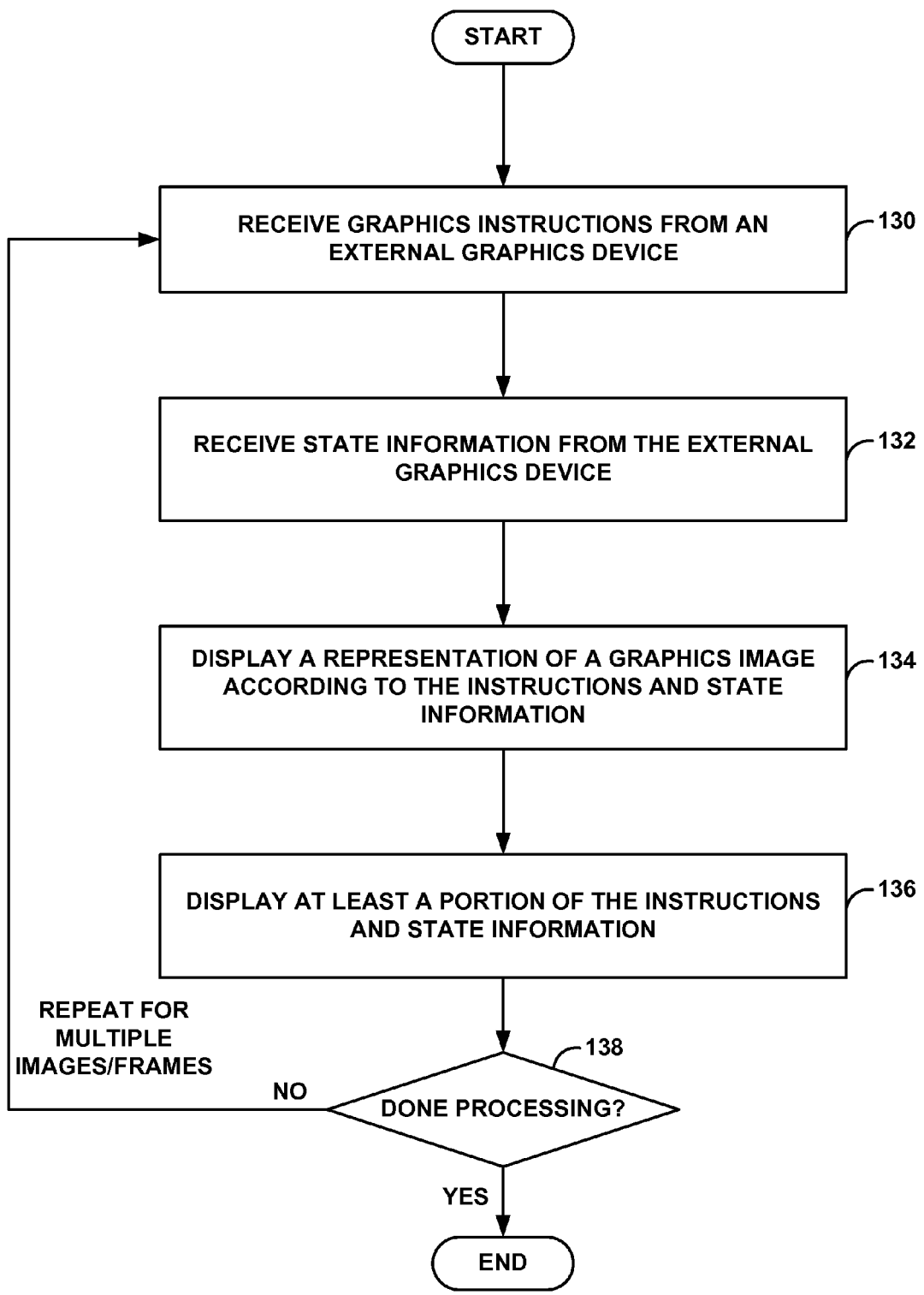
FIG. 7 is a flow diagram of a first method that may be performed by the application computing device shown in FIG. 1 or FIG. 2, according to one aspect of the disclosure.

FIG. 7 is a flow diagram of a method that may be performed by application computing device 20 through execution of simulation application 28 (FIG. 1) or simulation application 29 (FIG. 2) on processors 22, according to one aspect. Application computing device 20 receives a plurality of graphics instructions from an external graphics device, such as graphics instructions 30 from external graphics device 2 (130). Graphics instructions 30 are executed by graphics device 2 to display one or more graphics images, such as three-dimensional (3D) graphics images, on display device 6. In one aspect, graphics instructions 30 comprise a call stream that, when executed, renders the graphics images. In one aspect, the call stream comprises binary instructions generated from application programming interface (API) instructions.

Application computing device 20 may receive state and/or performance information 32 from graphics device 2 (132). State/performance information 32 is associated with execution of graphics instructions 30 on graphics device 2. State/performance information 32 may include state information that indicates one or more states of graphics device 2 as it renders a graphics image. The state information may include state information from one or more processors of graphics device 2 that execute graphics instructions 30, such as control processor 10, graphics processor 12, vertex processor 14, and/or display processor 16. State/performance information 32 may, in some cases, include graphics data (e.g., primitive data and/or rasterized data).

Application computing device 20 may display a representation of one or more graphics images according to graphics instructions 30 and the state/performance information 32 (134). In such fashion, application computing device 20 is capable of displaying a representation of these graphics images within a simulated environment that simulates graphics device 2. The simulated environment may be provided via execution of simulation application 28 on processors 22 of application computing device 20.

Application computing device 20 displays at least a portion of graphics instructions 30 and state/performance information 32 on display device 24 (136). In some cases, when graphics instructions 30 include binary instructions, application computing device 20 displays a visual representation of graphics instructions 30. As described previously, application computing device 20 may use instruction mapping information 31 to map graphics instructions 30 to a representation of instructions 30. The representation may comprise associated graphics application programming interface (API) instructions that may be visually displayed on display device 24. A visual representation of state/performance information 32 may also be displayed on display device 24. The receiving of the graphics instructions (130), receiving of the state information (132), displaying the representation of the graphics image (134), and displaying of the instructions and state information (136) may be repeated for multiple image frames of the one or more graphics images if there are more frames to process (138). In this fashion, application computing device 20 is capable of displaying both still and moving graphics images (including 3D images) on display device 24.

In one aspect, processors 22 may execute simulation application 28 to display a navigation controller on display device 24. A user, such as an application developer, may visually interact with the navigation controller within a graphical user interface displayed on display device 24. The graphical user interface may receive user input from the application developer to interact with the navigation controller to change a perspective view of the one or more displayed graphics images. A modified perspective view of the graphics image may then be displayed in the graphical user interface based upon the user input to the navigation controller.

In general, after the one or more graphics images are visually represented and displayed on display device 24, simulation application 28 (during execution on processors 22) may receive user input to modify the graphics image. For example, as will be described in further detail below, application computing device 20 may receive user input specifying one or more requested modifications 34 to the execution of graphics instructions 30 by external graphics device 2 (where graphics device 2 is external with respect to application computing device 20). Upon receipt of this user input, application computing device 20 sends requested modifications 34 to graphics device 2 for processing. Graphics device 2 may then process the requested modifications 34, as was described previously. In one aspect, requested modifications 34 may include at least one of a request to disable execution of one or more of graphics instructions 30 on graphics device 2, a request to modify one or more of graphics instructions 30 on graphics device 2, and a request to modify state/performance information 32 on graphics device 2.

Application computing device 20 may subsequently receive a plurality of updated graphics instructions and/or information 35 from graphics device 2. The updated graphics instructions/information 35 may be associated with requested modifications 34. Updated instructions/information 35 may include updated state information that is associated with the requested modifications 34 to the execution of graphics instructions 30 by graphics device 2. Upon receipt of updated instructions/information 35, application computing device 20 may display an updated version of the one or more graphics images according to updated instructions/information 35.

Figure 8:
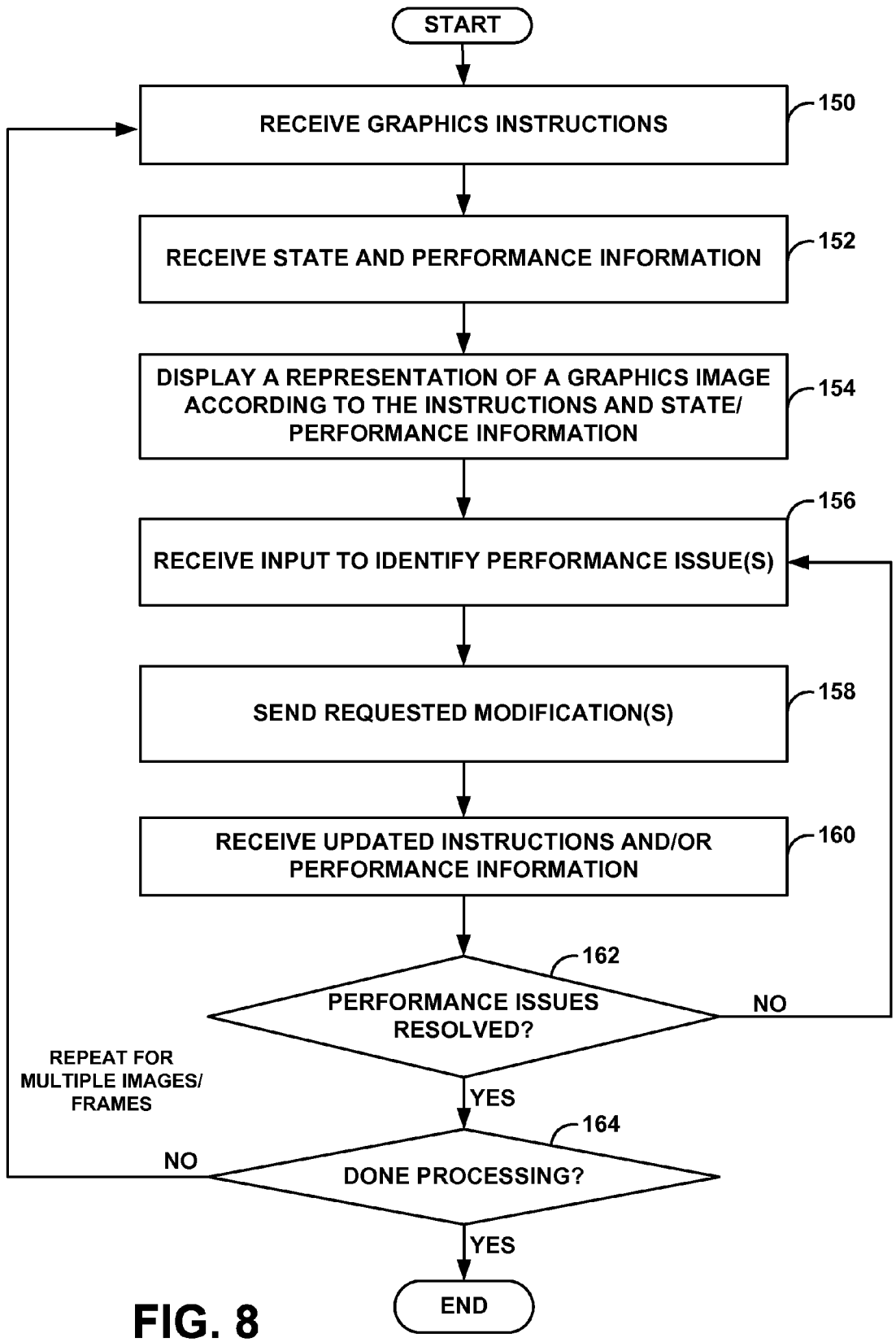
FIG. 8 is a flow diagram of a second method that may be performed by the application computing device shown in FIG. 1 or FIG. 2, according to one aspect of the disclosure.

FIG. 8 is a flow diagram of a method that may be performed by application computing device 20 through execution of simulation application 28 (FIG. 1) or simulation application 29 (FIG. 2) on processors 22, according to one aspect of the disclosure. In this aspect, application computing device 20 may receive graphics instructions 30 from graphics device 2 (150). Application computing device 20 may also receive state and/or performance information 32 from graphics device 2 (152). Upon receipt of graphics instructions 30 and state/performance information 32, application computing device 20 may display a representation of one or more graphics images according to the graphics instructions 30 and the state/performance information 32 (154).

During or upon creation of these images, application computing device 20 may receive input to identify one or more performance issues (156). For example, in some cases, application computing device 20 may automatically receive input from simulation application 28 to identify potential bottlenecks in the execution of graphics instructions 30 based upon the execution of graphics instructions 30 and/or upon the analysis of state/performance information 32 provided by graphics device 2. These bottlenecks may be associated with execution of graphics instructions 30 within the processing pipeline of graphics device 2, such as control processor 10, graphics processor 12, vertex processor 14, and/or display processor 16. In some cases, application computing device 20 may receive input from a user, such as an application developer, that specifies or otherwise identifies one or more performance issues during execution of graphics instructions 30 on application computing device 20 to create the graphics images.

In one aspect, state/performance information 32 includes performance information that is associated with execution of graphics instructions 30 on graphics device 2. Application computing device 20 may analyze the performance information to identify one or more performance issues on graphics device 2 during its execution of graphics instructions 30. In some cases, the performance information may include performance metrics gathered from one or more of processors 10, 12, 14, or 16 that may execute graphics instructions 30 on graphics device 2. When application computing device 20 analyzes the performance information received from graphics device 2, it may identify decreased performance in one or more of these processors 10, 12, 14, or 16.

Upon identification of such issues, application computing device 20 may send one or more requested modifications 34 to the execution of graphics instructions 30 to graphics device 2 (158). In some cases, application computing device 20 may receive user input specifying one or more of the requested modifications 34. In one aspect, requested modifications 34 may include at least one of a request to disable execution of one or more of graphics instructions 30 on graphics device 2, a request to modify one or more of graphics instructions 30 on graphics device 2, and a request to modify state/performance information 32 on graphics device 2.

After graphics device 2 has processed requested modifications 34 (such as was described previously), application computing device 20 may receive a plurality of updated instructions and/or information 35 from graphics device 2 (160). Updated instructions/information 35 may include updated graphics instructions and/or updated performance information. Any updated graphics instructions and/or performance information may be associated with the requested modifications 34 to the execution of graphics instructions 30 by graphics device 2. Application computing device 20 may then display an updated representation of the one or more graphics images on display device 24 according to the updated graphics instructions and the updated performance information.

Application computing device 20 may then analyze the updated performance information to determine whether one or more of the previously identified performance issues have been resolved (162). In some cases, application computing device 20 may be able to automatically analyze, or process, updated instructions/information 35 to determine whether certain performance issues have been resolved or otherwise mitigated. In some cases, an application developer may be able to indicate to application computing device 20, via user input, that certain performance issues have been resolved or otherwise mitigated upon the developer's analysis of updated instructions/information 35 and/or review of the updated representation of the graphics images that have been displayed on display device 24.

Application computing device 20 repeats, in an iterative fashion, the acts of identifying existing performance issues, sending requested modifications 34 to graphics device 2, and receiving updated instructions and/or information 35 until the identified performance issues have been resolved or otherwise mitigated. Application computing device 20 also repeats the acts shown in FIG. 8 for multiple image frames of the one or more graphics images that are visually represented on display device 24 (164). In this fashion, application computing device 20 is capable of displaying both still and moving graphics images (including 3D images) on display device 24.

Figure 9:
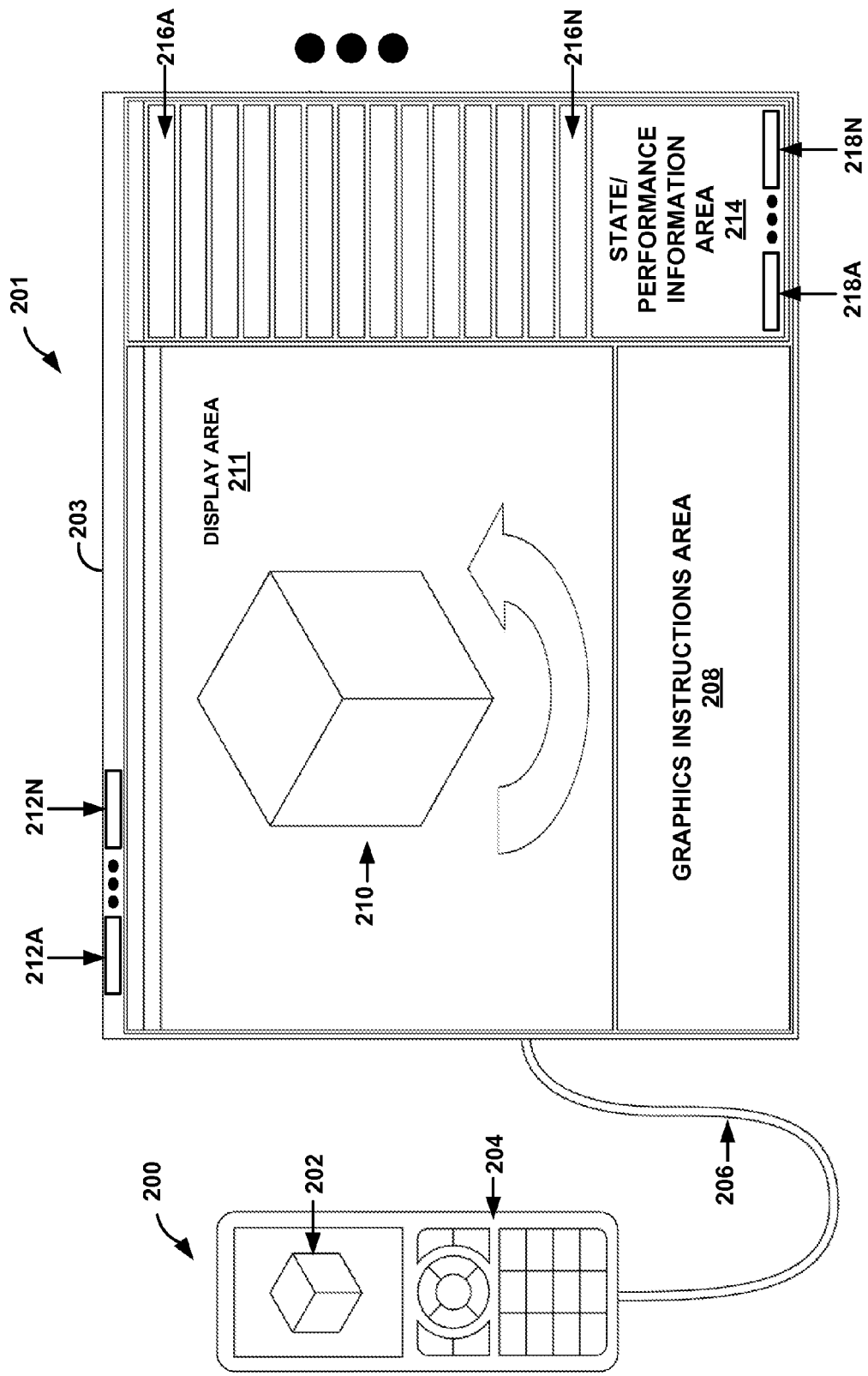
FIG. 9 is a conceptual diagram illustrating an example of a graphics device that is coupled to a display device for displaying information in a graphic window, according to one aspect of the disclosure.

FIG. 9 is a conceptual diagram illustrating an example of a graphics device 200 that is coupled to a display device 201 for displaying information in a graphic window 203, according to one aspect. If, for example, graphics device 200 is part of graphics device 2 (FIG. 1), display device 201 may be part of graphics device 24 in application computing device 20. Graphics device 200 is capable of displaying a 3D graphics image 202. Display device 201 is capable of displaying, within window 203, a 3D graphics image 210, which is a representation of graphics image 202, based upon graphics instructions and state/performance information that is sent from graphics device 200.

Display device 201 may also be capable of displaying visual representations of these instructions and state/performance information, such that a developer may change these instructions and information to modify graphics image 210 or an entire scene that includes graphics image 210. Display device 201 may be included within any type of computing device (not shown) that is coupled to graphics device 200 and is capable of receiving such instructions and state/performance information from graphics device 200. For purposes of simplicity, the computing device that includes display device 201 has been left out of the conceptual diagram shown in FIG. 10.

As described previously, graphics device 200 is capable of display 3D graphics image 202 (which is a cube in the example of FIG. 9). Graphics device 200 also has a keypad 204. A user may interact with keypad 204 to manipulate graphics device 200. Keypad 204 may include a number of keys and/or buttons. Graphics device 200 is capable of sending graphics instructions and state/performance information to a device (e.g., application computing device 20) that includes graphics device 201 via connector 206. In one aspect, connector 206 comprises a Universal Serial Bus (USB) connector. In other aspects, different forms of connectors may be used, such as an Institute of Electrical and Electronic Engineers (IEEE) 1394 connector. In some aspects, wireless communication may replace connector 206.

As shown in the example of FIG. 9, display device 201 may display various types of information within a graphical user interface. In this example, display device 201 displays graphical window 203 within the graphical user interface. Window 203 includes a display area 211, a graphics instructions area 208, and a state/performance information area 214. Display area 211 includes 3D graphics image 210, which, as described previously, is a representation of 3D graphics image 202. In this example, 3D graphics image comprises a cube. The information displayed on display device 201 comprises a representation, or simulation, of information displayed on graphics device 202 for purposes of debugging and testing, according to one aspect.

In the example of FIG. 9, graphics instructions area 208 includes a visual representation of one or more graphics instructions that have been received from graphics device 200. As described previously, the visual representation of such instructions may comprise a representation of such instructions. For example, if graphics device 200 sends binary graphics instructions, display device 201 may display a representation of such binary instructions in another form, such as higher-level application programming interface (API) instructions (e.g., OpenGL instructions). Mapping information (such as mapping information 31 shown in FIG. 1) may be used to map received binary instructions into another format that may be displayed within graphics instructions area 208.

State/performance information area 214 includes a visual representation of selected state and/or performance information that has been received from graphics device 200. The received graphics instructions and state/performance information may be used to display 3D graphics image 210 within display area. In one aspect, graphics device 200 may utilize a graphics driver that implements a state/performance data module (such as state/performance data module 116 shown in FIG. 5) to provide various state and/or performance data. The received state/performance information may include graphics data (e.g., primitive data and/or rasterized data).

Window 203 also includes one or more selectors 212A-212N. A user may select any of these selectors 212A-212N. Each selector 212A-212N may be associated with different functions, such as statistical and navigation functions, as will be described in more detail below. Window 203 further includes selectors 216A-216N and 218A-218N, each of which may be selected by a user. Each selector 216A-216N and 218A-218N may also be associated with different functions, such as metric functions, override functions, and/or texture functions, as will be described in more detail below in reference to FIG. 10.

A user, such as an application developer, may change information displayed within window 203. For example, the user may modify one or more of the instructions displayed within graphics instructions area 208, or any of the state/performance information within state/performance information area 214.

Any changes initiated by the user within window 203 may then be sent back to graphics device 200 as requested modifications. Graphics device 200 may then process these modifications, and provide updated instructions and/or information which may then be displayed within graphics instructions area 208 and/or state/performance information area 214. The updated instructions and/or information may also be used to display a modified version of 3D graphics image 210 within display area 211.

In one aspect, the state and/or performance information that may be displayed within area 214 may be analyzed by the computing device that includes display device 201 (such as application computing device 20 shown in FIG. 1) to identify potential bottlenecks during execution of the graphics instructions on graphics device 200. Ultimately, a user, such as an application developer, may wish to view the information presented in window 203 during a debugging process to optimize the execution of graphics instructions on graphics device 200. As described previously, bottlenecks may be introduced anywhere within the graphics processing pipeline in graphics device 200, and it may be difficult for an application developer to isolate such bottlenecks for performance optimization. Through analysis of state and/or performance information, potential bottlenecks and possible workarounds can be displayed in window 203, such as within one or more sub-windows or pop-up windows, or within area 214 of window 203.

In one aspect, window 203 may display a report on the bottlenecks encountered in the call-stream of the graphics instructions received from graphics device 200, and may also display possible workarounds. In some cases, these possible workarounds may be presented as "what-if" scenarios to the user. For example, rendering a non-optimized triangle-list in a call-stream may be presented as one possible scenario, while pre-processing that list through a triangle-strip optimization framework may be presented as a second possible scenario. The user may select any of these possible workaround scenarios as requested modifications, and the requested modifications are then transmitted back to graphics device 200, where the performance may be measured. Graphics device 200 then sends updated instructions/information, which may be presented within graphics instruction area 208 and/or state/performance information area 214. The user can then view the results, and compare results for various different potential workarounds to identify an optimum solution. The user can use this process to quickly identify a series of steps that can be taken in order to remove bottlenecks from their application.

The user may iteratively continue to make adjustments within window 203 for purposes of experimentation, or trial/error debugging. The user may experiment with various different forms or combinations of graphics instructions and state/performance information to identify changes in the images or scenes that are displayed within display area 211. The user can use the simulation environment provided by the contents of window 203 to interactively view and modify the graphics instructions, which may be part of a call-stream, and states provided by graphics device 200 without having to recompile source code and re-execute the compiled code on graphics device 200.

In some cases, the user may manipulate one or more of buttons 212A-212N to manipulate a graphical navigation controller, such as graphical camera, to modify a perspective view of graphics image 210. Such manipulation may be captured as requested modifications that are then sent back to graphics device 200. The updated instructions/information provided by graphics device 200 are then used to modify the perspective view of graphics image 210.

In some cases, various texture and/or state information may be provided in area 214 of window 203 as modifiable entities. In addition, a user may even select, for example, a pixel of graphics image 210 within display area 211, such that one or more corresponding instructions within graphics instruction area 208 are identified. In this fashion, a user can effectively drill backwards to a rendering instruction or call that was used to render or create that pixel or other portions of graphics image 210. Because graphics device 201 may create image 210 in window 203 exactly as it is presented on graphics device 200, the user is able to quickly isolate issues in their application (which may be based on the various graphics instructions displayed in graphics instructions area 208), and modify any states within state/performance area 214 to prototype new effects.

Figure 10:
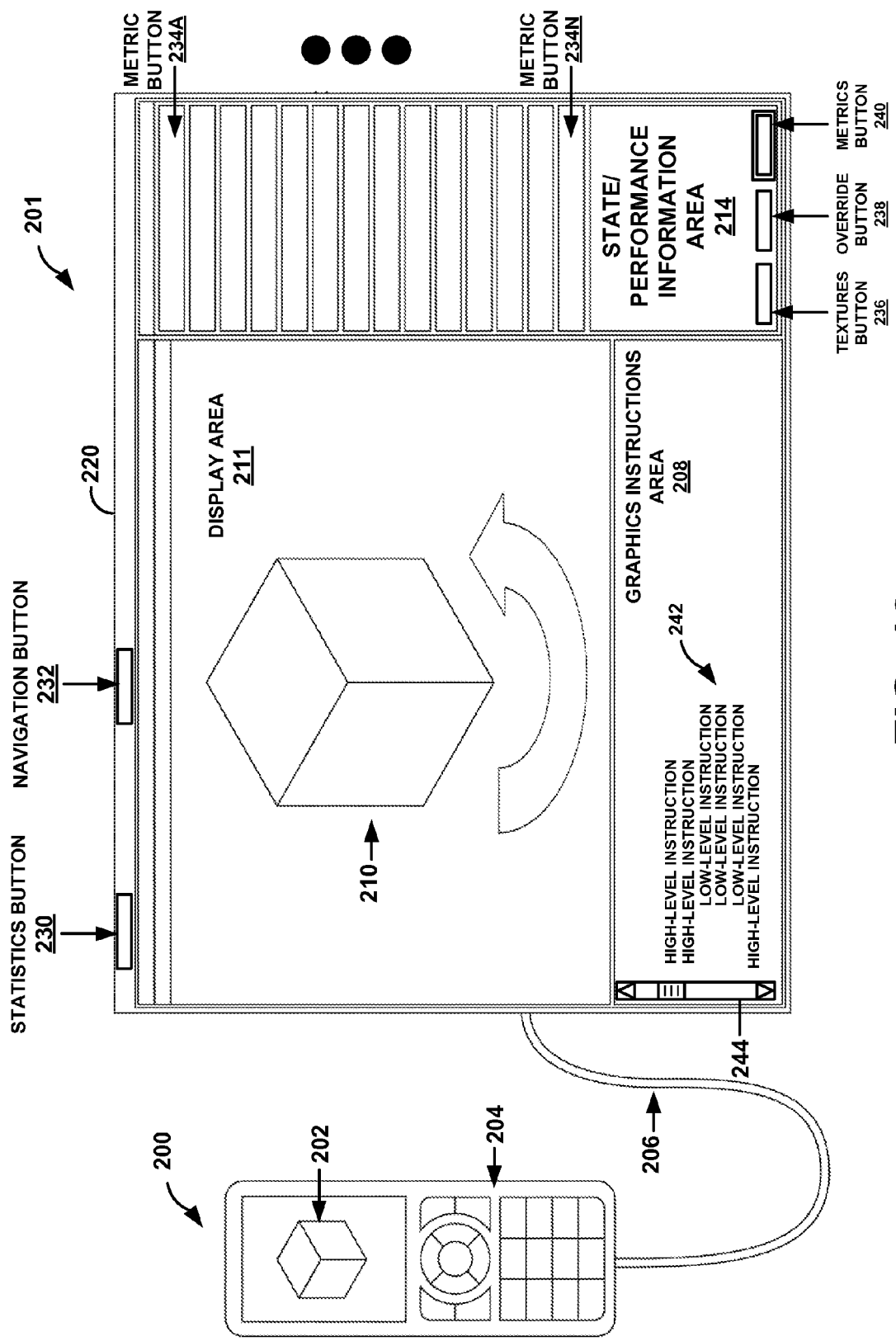
FIG. 10 is a conceptual diagram illustrating another example of a graphics device coupled to a display device that displays information within a graphical window, according to one aspect of the disclosure.

FIG. 10 is a conceptual diagram illustrating another example of graphics device 200 coupled to display device 201 that displays information within graphical window 220, according to one aspect. In this aspect, window 220 includes various instruction information as well as metric information.

For example, within graphics instructions area 208, various graphics instructions 242 are shown. Graphics instructions 242 may be a subset of graphics instructions that are provided by graphics device 200. For example, if graphics device 200 is part of graphics device 2, graphics instructions 242 may be a subset of graphics instructions 30. In some cases, mapping information (such as mapping information 31 shown in FIG. 1 or mapping information 33 shown in FIG. 2) may be used to map incoming instructions received from graphics device 200 to a visual representation of these instructions, materialized as instructions 242 that are displayed within graphics instructions area 208. For example, if the received instructions are in binary form, instructions 242 may comprise API instructions that were used to generate the instructions in binary form.

As is shown in the example of FIG. 10, graphics instructions 242 include both high-level instructions and low-level instructions. A user, such as an application developer, may use scrollbar 244 to view the full-set of instructions 242. Certain high-level instructions may include one or more low-level instructions, such as lower-level API instructions. The application developer may, in some cases, select (e.g., such as by clicking) on a particular high-level instruction in order to view any low-level instructions that are part of, or executed by, the associated high-level instruction. As described previously, received graphics instructions, such as instructions 242, are used to generate the representation of graphics image 202, which comprises graphics image 210 shown in display area 211 of window 220.

Various selection buttons are shown below state/performance information area 214 in FIG. 10. These selection buttons include a textures button 236, an override button 238, and a metrics button 240. In the example of FIG. 10, the application developer has selected the metrics button 240. Upon selection of this button, various metrics options may be displayed. For example, one or more metric buttons 234A-234N may be displayed above state/performance area 214. Each metric button 234A-234N may be associated with a particular metric. In some cases, one or more of these metrics may be predefined or preconfigured metric types and, in some cases, the application developer may select or customize one or more of the metrics. Example metrics may include, for example, any one or more of the following: frames per second, % busy (for one or more processors), bus busy, memory busy, vertex busy, vertices per second, triangles per second, pixel clocks per second, fragments per second, etc. The application developer may select any of metric buttons 234A-234N to view additional details regarding the selected metrics.

For example, if metric button 234A is associated with the number of frames per second, the application developer may select metric button 234A to view additional details on the number of frames per second (related to performance) for graphics image 210, or select portions of graphics image 210. The developer may, in some cases, select metric button 234A, or drag metric button 234A into state/performance information area 214. The detailed information on the number of frames per second may be displayed within state/performance information area 214. The developer also may drag metric button 234A into display area 211, or select a portion of graphics image 210 for application of metric button 234A. For example, the developer may select a portion of graphics image 210 after selecting metric button 234A, and then detailed information on the number of frames per second for that selected portion may be displayed within state/performance information area 214. In such fashion, the developer may view performance data for any number of different metric types based upon selection of one or more of metric buttons 234A-234N, and even possible selection of graphics image 210 (or a portion thereof).

In one aspect, metric data that may be displayed within window 220 may be provided by a graphics driver (e.g., graphics driver 18 shown in FIG. 5) of graphics device 200. This graphics driver may implement a hardware counter module (e.g., hardware counter module 114 of FIG. 5) and/or a processor usage module (e.g., processor usage module 112 of FIG. 5) to provide various data that may then be displayed as metric data within window 220.

The developer may, in some cases, also select textures button 236. Upon selection, various forms of texture information related to graphics image 210 may be displayed by graphics device 201. For example, texture information may be displayed within window 220, such as within state/performance information area 214. In some cases, the texture information may be displayed within an additional (e.g., pop-up) window (not shown). The developer may view the displayed texture information, but may also, in some cases, modify the texture information. In these cases, any modifications to the texture information may be propagated back to graphics device 200 as requested modifications. Upon receipt of updated instructions/information from graphics device 200, changes to graphics images 210 may be displayed within display area 211. FIG. 11 includes certain texture information that may be displayed upon selection of textures button 236.

The developer may, in some cases, also select override button 238. After selection of override button 238, certain information, such as instruction and/or state information, may be displayed (e.g., within window 220 or another window) which may be modified, or overridden, by the developer. Any modifications or overrides may be included within one or more requested modifications that are sent to graphics device 200. In one aspect, graphics device 200 may implement a graphics driver, such as graphics driver 18A (FIG. 5), to process any requested modifications. For example, graphics device 200 may use override module 120 to process such requested modifications that comprise one or more overrides.

In some cases, the developer may override one or more over graphics instructions 242 that are shown within graphics instructions area 208. In these cases, the developer may type or otherwise enter information within graphics instructions area 208 to modify or override one or more of graphics instructions 242. These modifications may then be sent to graphics device 200, which will provide updated instructions/information to update the display of graphics image 210 within display area 211. The developer may change, for example, parameters, ordering, type, etc., of graphics instructions 242 to override one or more functions that are provided by instructions 242. In one aspect, mapping information 31 (FIG. 1) or mapping information 33 (FIG. 2) may be used to map, or convert, changes to graphics instructions 242 into corresponding instructions of another format (e.g., binary instructions) that may then be provided to graphics device 200.

Figure 12:
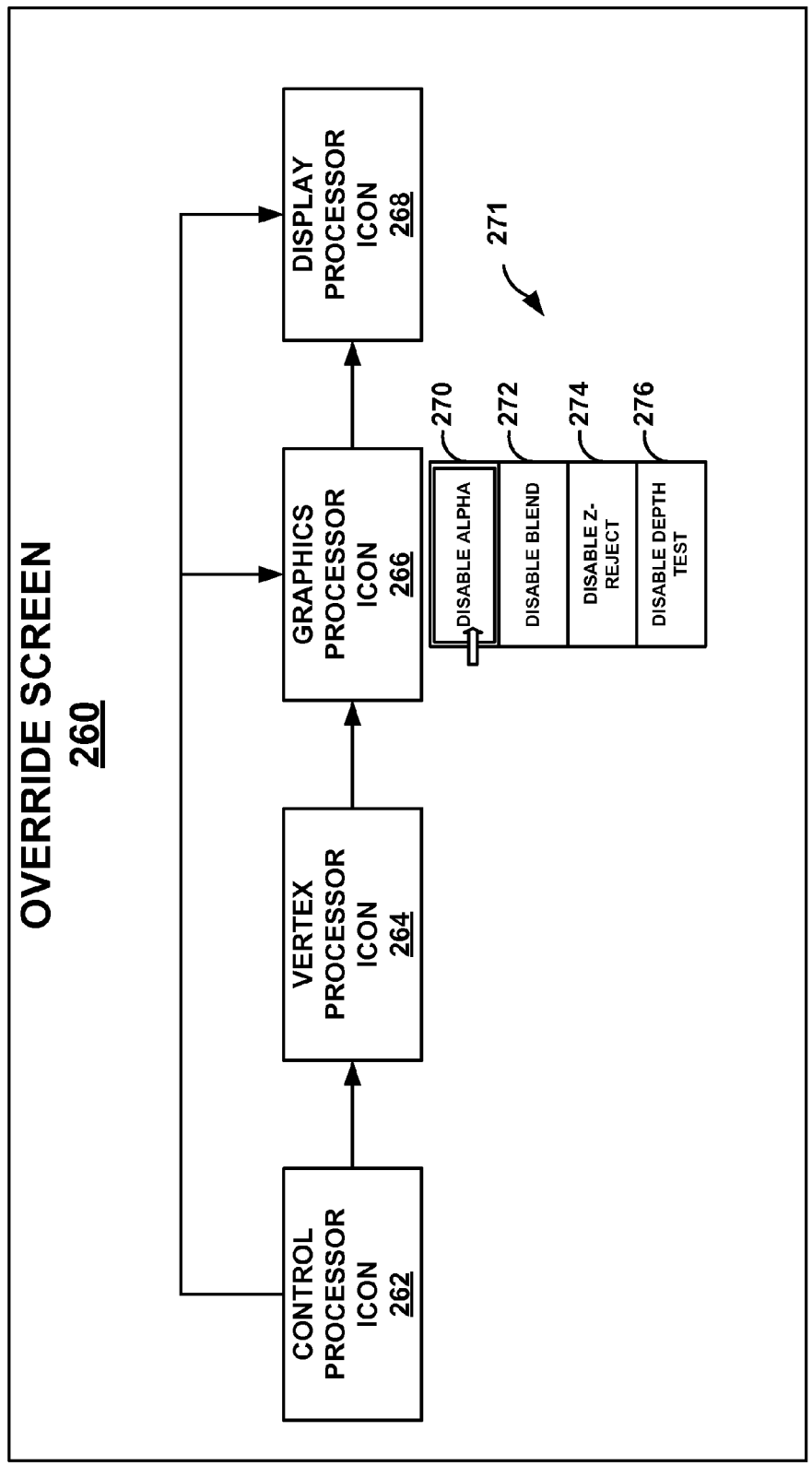
FIG. 12 is a screen diagram illustrating an example of an override screen that may be displayed on the graphics device shown in FIG. 10, according to one aspect of the disclosure.

In some cases, the developer may also select override button 238 to override one or more functions associated with the processing pipeline that is implemented by graphics device 200. FIG. 12 shows an example of an override screen that may be displayed to the developer upon selection of override button 238.

Window 220 further includes selection buttons 230 and 232. Selection button 230 is a statistics button, and selection button 232 is a navigation button. The developer may select statistics button 230 to view statistical information associated with the display of graphics image 210. This statistical information may comprise one or more graphs, tables, or other forms of statistical information. FIG. 11 provides an example of certain statistical and texture information that may be displayed upon user selection of statistics button 230. The developer may view statistical information to obtain a better understanding of various performance or other related issues associated with the display of graphics image 210.

The developer may select navigation button 232 to navigate within display area 211, and even possibly to change a perspective view of graphics image 210 within display area 211. For example, upon selection of navigation button 232, a 3D graphical camera or navigation controller may be displayed. The developer may interact with the controller to navigate to any area within display area 211. The developer may also use the controller to change a perspective view of graphics image 210, such as by rotating graphics image 210 or zooming in/out.

In one aspect, any developer-initiated changes through selection of navigation button 232 and interaction with a graphical navigation controller may be propagated back to graphics device 200 as requested modifications (e.g., part of requested modifications 84 shown in FIG. 1). Updated instructions/information then provided by graphics device 200 may then be used to update the display (e.g., perspective view) of graphics image 210. In addition, updated instructions may be displayed within graphics instructions area 208. Updated state/performance information may also be displayed within state/performance information area 214.

As a result, the developer may effectively and efficiently determine how alternate perspectives, orientations, views, etc., for rendering and displaying graphics image 210 may affect performance and state of graphics device 200. This may be very useful to the developer in optimizing the graphics instructions 242 that are used to create and render graphics image 210 in the simulation environment displayed on display device 201, and effectively of graphics image 202 that is displayed on graphics device 200. In one aspect, any changes in the position, perspective, orientation, etc., of graphics image 210, based upon developer-initiated selections and controls within window 220, may also be seen as changes for graphics image 202 that may be displayed on graphics device 200 during the testing process.

Through interaction with graphical window 220 within a graphical user interface, the application developer can attempt to identify performance issues and/or bottlenecks during execution of graphics instructions 242, which are a visual representation of graphics instructions that are executed by graphics device 200 to create graphics image 202. A representation of graphics image 202 (i.e., graphics image 210) is displayed within display area 211 based upon graphics instructions 242 and state/performance data received by graphics device 200. By viewing graphics instructions 242, graphics image 210, and the state/performance information, as well as the effects that are based upon user-initiated modifications to one or more of these, an application developer can interactively and dynamically engage in a trial-and-error, or debugging, process to optimize the execution of instructions on graphics device 200, and to eliminate or mitigate any performance issues (e.g., bottlenecks) during instruction execution.

FIG. 11 is a diagram illustrating an example of statistical and/or texture information 250 that may be displayed by display device 201 of FIG. 10, according to one aspect. For example, one or more portions of statistical/texture information 250 may be displayed upon a user-selection of textures button 236. One or more portions of statistical/texture information 250 may also be displayed upon a user-selection of statistics button 230.

Statistical/texture information 250 shown in FIG. 11 includes a number of example statistical and/or texture fields that each may have one or more values. For example, information 250 includes a value for a number of render calls (associated with graphics instructions 242) that may be needed to render and display graphics image 210. Because data shown in window 220 is based upon a simulation of graphics device 200, the number of render calls may effectively indicate the number of calls that may be needed to render and display graphics image 202 on graphics device 200. A render call may be associated with one or more of graphics instructions 242, such as one or more high-level and/or low-level instructions.

Statistical/texture information 250 also includes values for average texture changes per render call and average state changes per render call. These values may provide the developer with information regarding the number of texture and/or state changes, which may affect overall performance.

For a particular frame of image data in graphics image 210, statistical/texture information 250 may include values for the number of vertices and number of triangles for the primitives that were rendered to create the frame of image data. In addition, values for the average triangles per render call and average vertices per render call are also displayed. These values may be helpful for the application developer in evaluating the efficiency of the render calls that are implemented by the graphics instructions.

Statistical/texture information 250 also includes texture size information. As shown near the bottom of FIG. 11, information 250 may provide values for one or more texture sizes (e.g., 64×64, 64×128, 128×128, 256×256), indicating the number of each texture size for graphics image 210.

In addition, statistical/texture information 250 also includes various values related to rendering performance and efficiency. For example, information 250 includes a value for the percent of optimized textures for graphics image 210. In some cases, the computing device that includes display device 201 (e.g., application computing device 20) may compute this value based upon the graphics instructions and/or state/performance information that is received from graphics device 200. The application developer may typically want this percent value to be as high as possible. If it is lower than desired, the developer may manipulate or change graphics instructions, state information, performance information, or other parameters within window 220 to provide one or more requested modifications to graphics device 200. Upon receipt of updated instructions/information from graphics device 200, an updated value may be displayed for the percentage of optimized textures. The developer may continue with this process, such as during a debugging or trial-and-error session, to optimize the textures within the simulation environment provided in window 220. The developer may be able to do so in an effective and efficient fashion, without necessarily having to re-compile any code/instructions.

Statistical/texture information 250 further includes values for the percentages of indexed and stripped vertices. These values may indicate a percentage of optimized triangles for the rendering and display or graphics image 210. The application developer may typically want the percent values of indexed and stripped vertices to be as high as possible. If they are lower than desired, the developer may manipulate or change graphics instructions, state information, performance information, or other parameters within window 220 to provide one or more requested modifications to graphics device

200. Upon receipt of updated instructions/information from graphics device 200, updated values may be displayed for these percentage values. The developer may continue with this process to obtain an optimized number of triangles without having to re-compile any code/instructions or engage in time-consuming or tedious debugging operations on graphics device 200.

FIG. 12 is a screen diagram illustrating an override screen 260 that may be displayed on graphics device 201 shown in FIG. 10, according to one aspect of the disclosure. An application developer may view override screen 260 and make one or more selections of information displayed within override screen 260 to override one or more functions provided by graphics device 200, thereby altering the flow of instruction execution on graphics device 200.

In some cases, override screen 260 may be displayed upon user selection of override button 238. Override screen 260 may be displayed as part of screen 220, or may be displayed as a separate window (e.g., pop-up window). Override screen 260 shows a visual representation of the graphics processing pipeline that may be implemented by graphics device 200. In one aspect, graphics device 200 may comprise graphics device 2 shown in FIG. 1, in which case it may include a control processor, a vertex processor, a graphics processor, and a display processor. As a result, the visual representation of the graphics processing pipeline shown in override screen 260 may include a control processor icon 262, a vertex processor icon 264, a graphics processor icon 266, and a display processor icon 268.

Each icon 262, 264, 266, and 268 is associated with a corresponding processor within graphics device 200. These icons may comprise graphical, textual, or other forms of icons. The application developer may select one or more of icons 262, 264, 266, or 268, such as by clicking on an icon within override screen 260. Upon selecting an icon, such as graphics processor icon 266, override screen 260 displays a corresponding menu 271, such as a drop-down menu, associated with icon 266.

In the example of FIG. 12, menu 271 includes four selectable options: option 270 (to disable alpha/transparency operations), option 272 (to disable blending operations), option 274 (to disable Z-reject operations), and option 276 (to disable depth testing operations). Each of the operations associated with options 270, 272, 274, and 276 correspond to operations that may be performed by a graphics processor within graphics device 200.

FIG. 12 shows that a user selection has been made for option 270 to disable alpha (transparency) operations. Upon user selection of option 270, a requested modification may be sent to graphics device 200 to disable alpha operations. If graphics device 200 implements graphics driver 18A shown in FIG. 5, graphics device 200 may use override module 120 to process the requested modification, or override. Override module 120 may then send an override request to the corresponding graphics processor (e.g., graphics processor 12 shown in FIG. 1) to disable alpha operations.

Similarly, the application programmer may select option 272 to disable blending operations on the graphics processor. The developer may select option 274 to disable Z-reject operations. The developer may select option 276 to disable operations related to depth testing within the graphics processor.

In the example of FIG. 12, the developer may override one or more functions associated with the graphics processor of graphics device 200, such as by disabling one or more operations that may have been previously enabled. In some cases, the developer may use another menu, similar to menu 271, to re-enable any operations that were previously disabled, such as alpha, blending, Z-reject, and/or depth testing operations.

Thus, the developer may continuously and iteratively override, or change, various functions and operations for graphics processor, and then determine how such changes affect performance. For example, the developer may disable alpha operations by selecting menu option 270, and then view updated state/performance information that is provided by graphics device 200 upon disabling of such operations to determine if any prior performance issues, such as those related to the graphics processor of graphics device 200, have been resolved or mitigated. The developer may also review statistical information, such as the type of example information shown in FIG. 11, to assess changes or possible improvements in performance based upon the disabling of alpha operations. In addition, an updated version of graphics image 210 and updated instructions 242 may be displayed in window 220 (FIG. 10) upon disabling of alpha operations.

Of course, in other scenarios, the application developer may disable or enable other functions that are associated with a graphics processor. In addition, the developer may disable or enable functions that are associated with other processors in graphics device 200, such as a control processor, vertex processor, and/or display processor. For example, the developer may select control processor icon 262 to view a menu similar to menu 271, which may include one or more selectable options to disable or enable one or more functions associated with the control processor (e.g., control processor 10 shown in FIG. 1). Any changes to these functions may be provided as one or more requested modifications that are sent to graphics device 200 for processing, such as by override module 120. Updated instructions and/or other information, such as state and/or performance information, may then be provided by graphics device 200 to update the information shown in window 220, such that the developer may determine whether any performance issues or bottlenecks related to the control processor have been resolved or otherwise mitigated.

Figure 13:
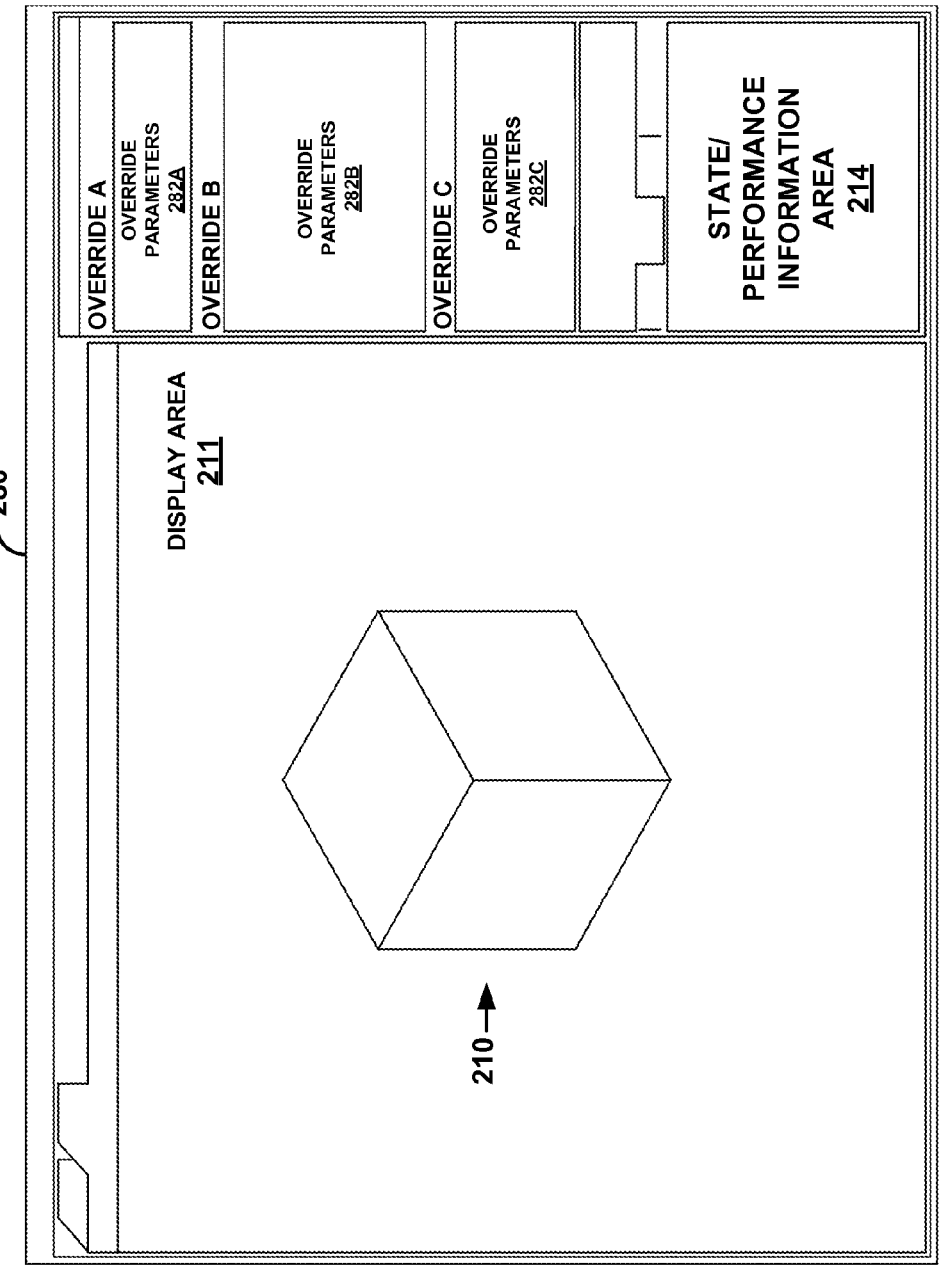
FIG. 13 is a screen diagram illustrating an example of override information that may be displayed on the graphics device shown in FIG. 10, according to one aspect of the disclosure.

FIG. 13 is a screen diagram illustrating an example of override information that may be displayed on graphics device 201 shown in FIG. 10, according to one aspect of the disclosure. In this aspect, the override information is shown within a graphical window 280. Graphics image 210 is shown within display area 211. As described previously, a user may request one or more overrides to modify the display of graphics image 210 within display area 211. In one scenario, the user may select the override button 238 (FIG. 10) to make one or more override selections. FIG. 13 shows an example of override information that may be displayed within window 280 upon user selection of override button 238.

FIG. 13 shows three example overrides: Override A, Override B, Override C. Each of these three example overrides may correspond to any override function, such as a disable function, an enable function, or the like (including those shown in FIG. 12). In addition, each of these three example overrides may be associated with functionality of one or more processors. Thus, the user may select one or more of the overrides to alter behavior of one or more processors, such as to enable or disable certain operations of these processors.

Each override (Override A, Override B, and Override C) may have corresponding parameters or options that may be selected, or otherwise configured, by the user. For example, Override A has override parameters 282A, Override B has override parameters 282B, and Override C has override parameters 282C. The user may customize each of the overrides by modifying the corresponding parameters. For example, if Override A corresponds to an override to disable blending, the user may select or change override parameters 282A to modify or customize the override functionality for disabling blending. Override parameters 282A may also include an identification of one or more processors. For example, if the user wishes to disable blending on a graphics processor, override parameters 282A may include an identification of the graphics processor.

Any overrides requested by the user may be included within requested modifications 34 that are sent back to the graphics device. The graphics device may then process the requested modifications 34, as described previously, and provide updated instructions/information 35. The updated instructions/information 35 may be used to update the display of graphics image 210 within display area 211.

Figure 14:
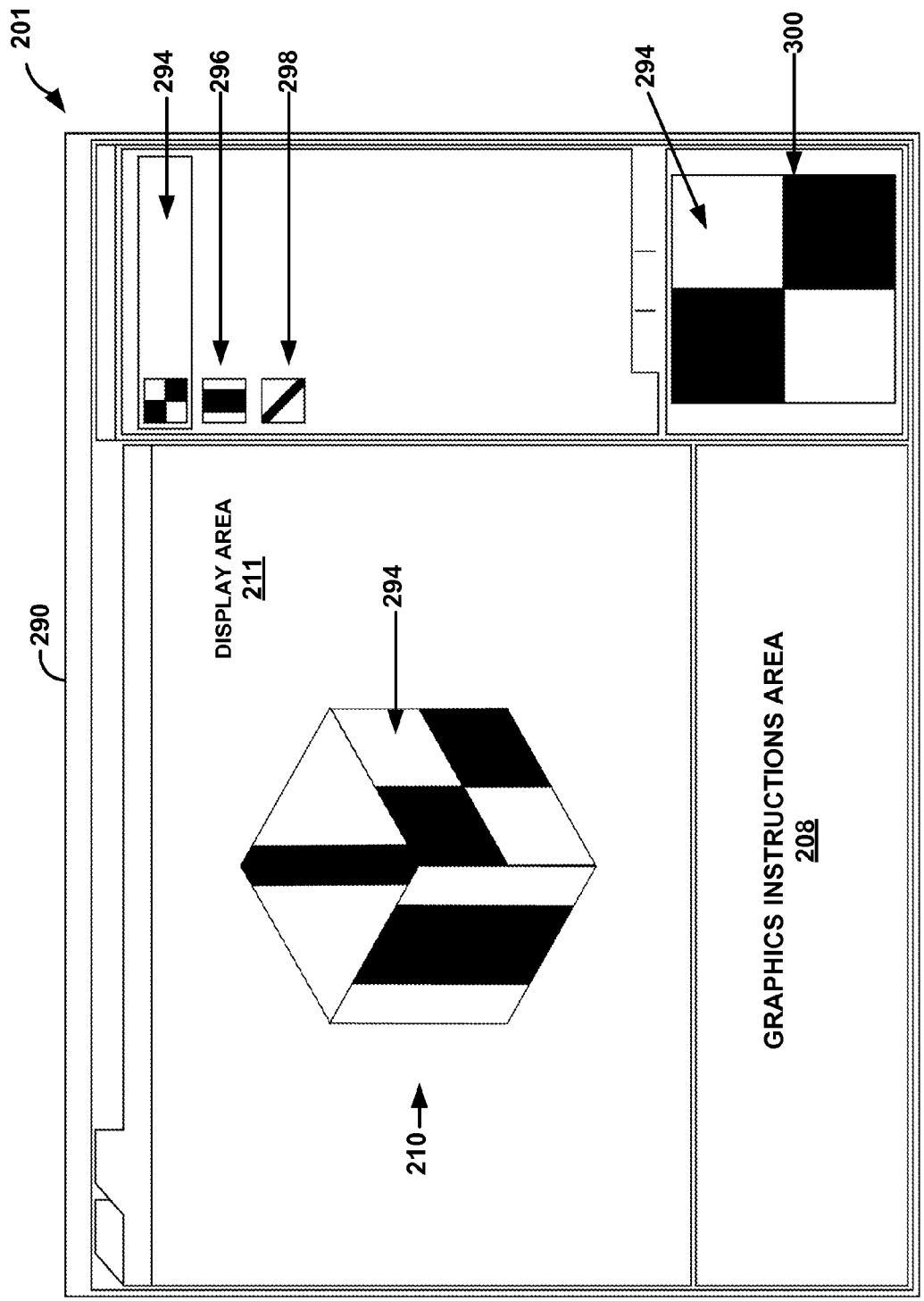
FIG. 14 is a screen diagram illustrating an example of texture information that may be displayed on the graphics device shown in FIG. 10, according to one aspect of the disclosure.

FIG. 14 is a screen diagram illustrating an example of texture information that may be displayed on graphics device 201 shown in FIG. 10, according to one aspect of the disclosure. In this aspect, the texture information is shown within a graphical window 290. Graphics image 210 is shown within display area 211. The user may modify one or more textures of graphics image 210, which can then be shown within display area 211.

For example, in FIG. 14, the user may select any of textures 294, 296, and/or 298. In FIG. 14, it is assumed that the user has selected texture 294, as shown. Any number of different textures may be displayed and selected within window 290, and the ones displayed in FIG. 14 are shown for purposes of illustration only.

Upon user selection of texture 294, an enlarged representation of the selected texture 294 is shown in texture area 300. The user may then apply texture 294 to one or more portions of graphics image 210. In one scenario, the user may drag the texture 294 from texture area 300 into display area 211 and apply the texture to the desired portion(s) of graphics image 210. In the example of FIG. 14, the user has applied texture 294 to the indicated portion of graphics image 210. In this fashion, the user may select any of one or more textures (e.g., textures 294, 296, 298) and apply such textures to graphics image 210, and also view the corresponding changes to graphics image 210 within display area 211.

Any textures selected or applied by the user may be included within requested modifications 34 that are sent back to the graphics device. The graphics device may then process the requested modifications 34, as described previously, and provide updated instructions/information 35. The updated instructions/information 35 may be used to update the display of graphics image 210 within display area 211.

FIG. 15 is a screen diagram illustrating an example of performance information that may be displayed on graphics device 201 shown in FIG. 10, according to one aspect of the disclosure. In this aspect, the performance information is shown within a graphical window 302. In the example of FIG. 15, the performance information is represented by a performance graph 304. The graph 304 shows time along the horizontal axis, and the percentage (%) of processor usage along the vertical axis. The percentage of processor usage may correspond to the percent usage of one or more processors within a graphics processing system, such as a control processor, a display processor, a vertex processor, and/or a graphics processor.

By continuously monitoring performance graph 304, a user may be able to assess the effectiveness of any changes made or sent back to the graphics device within requested modifications 34. For example, the user may update graphics instructions, update state/performance information, modify a perspective view of a graphics image, initiate one or more overrides, change textures, or make other modifications in an effort to resolve or otherwise mitigate any observed performance issues or bottlenecks during execution of a graphics application. Certain changes may improve performance by decreasing the percent usage (or processor utilization), while other changes may increase processor utilization. In order to help identify optimal or desirable solutions or changes to the graphics application, such as those that result in lower or decreased processor utilization, the user may continuously monitor performance graph 304 to ascertain the effects of any implemented changes, such as those included within requested modifications 34, over time.

The techniques described in this disclosure may be implemented within a general purpose microprocessor, digital signal processor (DSP), application specific integrated circuit (ASIC), field programmable gate array (FPGA), or other equivalent logic devices. Accordingly, the terms "processor" or "controller," as used herein, may refer to any one or more of the foregoing structures or any other structure suitable for implementation of the techniques described herein.

The various components illustrated herein may be realized by any suitable combination of hardware, software, firmware, or any combination thereof. In the figures, various components are depicted as separate units or modules. However, all or several of the various components described with reference to these figures may be integrated into combined units or modules within common hardware and/or software. Accordingly, the representation of features as components, units or modules is intended to highlight particular functional features for ease of illustration, and does not necessarily require realization of such features by separate hardware or software components. In some cases, various units may be implemented as programmable processes performed by one or more processors.

Any features described herein as modules, devices, or components, including graphics device 100 and/or its constituent components, may be implemented together in an integrated logic device or separately as discrete but interoperable logic devices. In various aspects, such components may be formed at least in part as one or more integrated circuit devices, which may be referred to collectively as an integrated circuit device, such as an integrated circuit chip or chipset. Such circuitry may be provided in a single integrated circuit chip device or in multiple, interoperable integrated circuit chip devices, and may be used in any of a variety of image, display, audio, or other multi-media applications and devices. In some aspects, for example, such components may form part of a mobile device, such as a wireless communication device handset.

If implemented in software, the techniques may be realized at least in part by a computer-readable data storage medium comprising code with instructions that, when executed by one or more processors, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), embedded dynamic random access memory (eDRAM), static random access memory (SRAM), flash memory, magnetic or optical data storage media.

The techniques additionally, or alternatively, may be realized at least in part by a computer-readable communication medium that carries or communicates code in the form of instructions or data structures and that can be accessed, read, and/or executed by one or more processors. Any connection may be properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media. Any software that is utilized may be executed by one or more processors, such as one or more DSP's, general purpose microprocessors, ASIC's, FPGA's, or other equivalent integrated or discrete logic circuitry.

Various aspects have been described in this disclosure. These and other aspects are within the scope of the following claims.

The invention claimed is:

1. A method comprising:
   receiving, by a computing device, graphics instructions that are sent from an external graphics device, wherein the graphics instructions are executed by the external graphics device to display a graphics image;
   receiving, by the computing device, state information that is sent from the external graphics device, wherein the state information is associated with execution of the graphics instructions on the external graphics device;
   executing, by the computing device, a simulation application that provides a simulated environment to simulate the external graphics device; and
   displaying, by the computing device during execution of the simulation application, a representation of the graphics image within the simulated environment according to the graphics instructions and the state information.

2. The method of claim 1, further comprising:
   repeating the receiving of the graphics instructions, receiving of the state information, and displaying of the representation of the graphics image for multiple frames of the graphics image.

3. The method of claim 1, wherein the state information indicates one or more states of the external graphics device as the external graphics device renders the graphics image.

4. The method of claim 1, wherein the state information comprises state information from one or more processors of the external graphics device that execute the graphics instructions.

5. The method of claim 1, wherein the state information comprises data associated with execution of the graphics instructions on the external graphics device.

6. The method of claim 1, further comprising:
   receiving user input via a graphical user interface provided by the computing device, the user input specifying a requested modification to the execution of the graphics instructions by the external graphics device; and
   sending the requested modification to the external graphics device for processing.

7. The method of claim 6, further comprising:
   receiving a plurality of updated graphics instructions from the external graphics device, wherein the updated graphics instructions are associated with the requested modification to the execution of the graphics instructions by the external graphics device;
   receiving updated state information from the external graphics device, wherein the updated state information is associated with the requested modification to the execution of the graphics instructions by the external graphics device; and
   displaying an updated version of the graphics image according to the updated graphics instructions and the updated state information.

8. The method of claim 6, wherein the requested modification comprises at least one of a request to disable execution of one or more of the graphics instructions on the external graphics device, a request to modify one or more of the graphics instructions on the external graphics device, and a request to modify the state information on the external graphics device.

9. The method of claim 1, further comprising:
   displaying a visual representation of the graphics instructions; and
   displaying a visual representation of the state information.

10. The method of claim 9, wherein displaying the visual representation of the graphics instructions comprises:
    mapping the graphics instructions to associated graphics application programming interface (API) instructions; and
    displaying the graphics API instructions.

11. The method of claim 1, comprising:
    providing, by the computing device, a graphical user interface that allows user modification of at least one of a visual representation of the graphics instructions in the simulated environment and a visual representation of the state information.

12. The method of claim 1, wherein the graphics instructions comprise binary instructions generated from application programming interface (API) instructions.

13. The method of claim 1, further comprising:
    displaying a navigation controller;
    receiving user input to interact with the navigation controller; and
    displaying a modified perspective view of the graphics image based upon the user input.

14. The method of claim 1, further comprising:
    receiving user input to modify the graphics image; and
    displaying a modified version of the graphics image according to the user input.

15. The method of claim 1, further comprising:
    receiving performance information from the external graphics device, wherein the performance information is associated with execution of the graphics instructions on the external graphics device; and
    analyzing the performance information to identify one or more performance issues on the external graphics device during its execution of the graphics instructions.

16. The method of claim 15, wherein the performance information comprises performance metrics gathered from one or more processors that execute the graphics instructions on the external graphics device.

17. The method of claim 16, wherein analyzing the performance information comprises identifying decreased performance in one or more of the processors of the external graphics device during execution of the graphics instructions.

18. The method of claim 15, further comprising:
    receiving user input via a graphical user interface provided by the computing device, the user input specifying a requested modification to the execution of the graphics instructions by the external graphics device;
    sending the requested modification to the external graphics device for processing;
    receiving a plurality of updated graphics instructions from the external graphics device, wherein the updated graphics instructions are associated with the requested modification to the execution of the graphics instructions by the external graphics device;
    receiving updated performance information from the external graphics device, wherein the updated performance information is associated with the requested modification to the execution of the graphics instructions by the external graphics device; and analyzing the updated performance information to determine whether one or more of the performance issues have been resolved.

19. The method of claim 18, wherein the requested modification comprises at least one of a request to disable execution of one or more of the graphics instructions on the external graphics device, a request to modify one or more of the graphics instructions on the external graphics device, and a request to modify the state information on the external graphics device.

20. The method of claim 18, further comprising:
displaying an updated representation of the graphics image according to the updated graphics instructions and the updated performance information.

21. A computer-readable storage medium comprising instructions for causing one or more processors to:
receive graphics instructions that are sent from an external graphics device, wherein the graphics instructions are executed by the external graphics device to display a graphics image;
receive state information that is sent from the external graphics device, wherein the state information is associated with execution of the graphics instructions on the external graphics device;
execute a simulation application that provides a simulated environment to simulate the external graphics device; and
display, during execution of the simulation application, a representation of the graphics image within the simulated environment according to the graphics instructions and the state information.

22. The computer-readable storage medium of claim 21, further comprising instructions for causing the one or more processors to:
repeat the receiving of the graphics instructions, receiving of the state information, and displaying of the representation of the graphics image for multiple frames of the graphics image.

23. The computer-readable storage medium of claim 21, wherein the state information indicates one or more states of the external graphics device as the external graphics device renders the graphics image.

24. The computer-readable storage medium of claim 21, wherein the state information comprises state information from at least one processor of the external graphics device that executes the graphics instructions.

25. The computer-readable storage medium of claim 21, wherein the state information comprises data associated with execution of the graphics instructions on the external graphics device.

26. The computer-readable storage medium of claim 21, further comprising instructions for causing the one or more processors to:
receive user input via a graphical user interface, the user input specifying a requested modification to the execution of the graphics instructions by the external graphics device; and
send the requested modification to the external graphics device for processing.

27. The computer-readable storage medium of claim 26, further comprising instructions for causing the one or more processors to:
receive a plurality of updated graphics instructions from the external graphics device, wherein the updated graphics instructions are associated with the requested modification to the execution of the graphics instructions by the external graphics device;
receive updated state information from the external graphics device, wherein the updated state information is associated with the requested modification to the execution of the graphics instructions by the external graphics device; and
display an updated version of the graphics image according to the updated graphics instructions and the updated state information.

28. The computer-readable storage medium of claim 26, wherein the requested modification comprises at least one of a request to disable execution of one or more of the graphics instructions on the external graphics device, a request to modify one or more of the graphics instructions on the external graphics device, and a request to modify the state information on the external graphics device.

29. The computer-readable storage medium of claim 21, further comprising instructions for causing the one or more processors to:
display a visual representation of the graphics instructions; and
display a visual representation of the state information.

30. The computer-readable storage medium of claim 29, wherein the instructions for causing the one or more processors to display the visual representation of the graphics instructions comprise instructions for causing the one or more processors to:
map the graphics instructions to associated graphics application programming interface (API) instructions; and
display the graphics API instructions.

31. The computer-readable storage medium of claim 21, further comprising instructions for causing the one or more processors to:
provide a graphical user interface that allows user modification of at least one of a visual representation of the graphics instructions in the simulated environment and a visual representation of the state information.

32. The computer-readable storage medium of claim 21, wherein the graphics instructions comprise binary instructions generated from application programming interface (API) instructions.

33. The computer-readable storage medium of claim 21, further comprising instructions for causing the one or more processors to:
display a navigation controller;
receive user input to interact with the navigation controller; and
display a modified perspective view of the graphics image based upon the user input.

34. The computer-readable storage medium of claim 21, further comprising instructions for causing the one or more processors to:
receive user input to modify the graphics image; and
display a modified version of the graphics image according to the user input.

35. The computer-readable storage medium of claim 21, further comprising instructions for causing the one or more processors to:
receive performance information from the external graphics device, wherein the performance information is associated with execution of the graphics instructions on the external graphics device; and
analyze the performance information to identify one or more performance issues on the external graphics device during its execution of the graphics instructions.

36. The computer-readable storage medium of claim 35, wherein the performance information comprises performance metrics gathered from at least one processor of the external graphics device that executes the graphics instructions on the external graphics device.

37. The computer-readable storage medium of claim 36, wherein the instructions for causing the one or more processors to analyze the performance information comprise instructions for causing the one or more processors to identify decreased performance in at least one processor of the external graphics device during execution of the graphics instructions.

38. The computer-readable storage medium of claim 35, further comprising instructions for causing the one or more processors to:
receive user input via a graphical user interface, the user input specifying a requested modification to the execution of the graphics instructions by the external graphics device;
send the requested modification to the external graphics device for processing;
receive a plurality of updated graphics instructions from the external graphics device, wherein the updated graphics instructions are associated with the requested modification to the execution of the graphics instructions by the external graphics device;
receive updated performance information from the external graphics device, wherein the updated performance information is associated with the requested modification to the execution of the graphics instructions by the external graphics device; and
analyze the updated performance information to determine whether one or more of the performance issues have been resolved.

39. The computer-readable storage medium of claim 38, wherein the requested modification comprises at least one of a request to disable execution of one or more of the graphics instructions on the external graphics device, a request to modify one or more of the graphics instructions on the external graphics device, and a request to modify the state information on the external graphics device.

40. The computer-readable storage medium of claim 38, further comprising instructions for causing the one or more processors to:
display an updated representation of the graphics image according to the updated graphics instructions and the updated performance information.

41. A device comprising:
a display device; and
one or more processors configured to:
receive graphics instructions that are sent from an external graphics device, wherein the graphics instructions are executed by the external graphics device to display a graphics image;
receive state information that is sent from the external graphics device, wherein the state information is associated with execution of the graphics instructions on the external graphics device;
execute a simulation application that provides a simulated environment to simulate the external graphics device; and
display, during execution of the simulation application, a representation of the graphics image within the simulated environment on the display device according to the graphics instructions and the state information.

42. The device of claim 41, wherein the one or more processors are further configured to repeat the receiving of the graphics instructions, receiving of the state information, and displaying of the representation of the graphics image for multiple frames of the graphics image.

43. The device of claim 41, wherein the one or more processors are further configured to display a visual representation of the graphics instructions on the display device, and to display a visual representation of the state information on the display device.

44. The device of claim 41, wherein the one or more processors are further configured to display a navigation controller on the display device, to receive user input to interact with the navigation controller, and to display a modified perspective view of the graphics image on the display device based upon the user input.

45. The device of claim 41, wherein the one or more processors are further configured to receive performance information from the external graphics device, wherein the performance information is associated with execution of the graphics instructions on the external graphics device, and to analyze the performance information to identify one or more performance issues on the external graphics device during its execution of the graphics instructions.

46. The device of claim 45, wherein the performance information comprises performance metrics gathered from at least one processor of the external graphics device that execute the graphics instructions on the external graphics device.

47. The device of claim 46, wherein the one or more processors are configured to analyze the performance information at least by identifying decreased performance in one or more of the processors of the external graphics device during execution of the graphics instructions.

48. The device of claim 45, wherein the one or more processors are further configured to:
receive user input via a graphical user interface, the user input specifying a requested modification to the execution of the graphics instructions by the external graphics device;
send the requested modification to the external graphics device for processing;
receive a plurality of updated graphics instructions from the external graphics device, wherein the updated graphics instructions are associated with the requested modification to the execution of the graphics instructions by the external graphics device;
receive updated performance information from the external graphics device, wherein the updated performance information is associated with the requested modification to the execution of the graphics instructions by the external graphics device; and
analyze the updated performance information to determine whether one or more of the performance issues have been resolved.

49. The device of claim 48, wherein the requested modification comprises at least one of a request to disable execution of one or more of the graphics instructions on the external graphics device, a request to modify one or more of the graphics instructions on the external graphics device, and a request to modify the state information on the external graphics device.

50. The device of claim 48, wherein the one or more processors are further configured to display an updated representation of the graphics image on the display device according to the updated graphics instructions and the updated performance information.

51. The device of claim 41, wherein the one or more processors are further configured to provide a graphical user interface that allows user modification of at least one of a visual representation of the graphics instructions in the simulated environment and a visual representation of the state information.

52. A device comprising:
- means for receiving graphics instructions that are sent from an external graphics device, wherein the graphics instructions are executed by the external graphics device to display a graphics image;
- means for receiving state information that is sent from the external graphics device, wherein the state information is associated with execution of the graphics instructions on the external graphics device;
- means for executing a simulation application that provides a simulated environment to simulate the external graphics device;
- means for displaying, during execution of the simulation application, a representation of the graphics image within the simulated environment according to the graphics instructions and the state information.

\* \* \* \* \*